(12) United States Patent
Tatsumi et al.

(10) Patent No.: US 10,739,999 B2
(45) Date of Patent: Aug. 11, 2020

(54) COMPUTER SYSTEM HAVING DATA AMOUNT REDUCTION FUNCTION AND STORAGE CONTROL METHOD

(71) Applicant: HITACHI, LTD., Tokyo (JP)

(72) Inventors: Ryosuke Tatsumi, Tokyo (JP); Yoshihiro Yoshii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 97 days.

(21) Appl. No.: 16/119,589

(22) Filed: Aug. 31, 2018

(65) Prior Publication Data
US 2019/0278484 A1    Sep. 12, 2019

(30) Foreign Application Priority Data

Mar. 9, 2018   (JP) ................. 2018-043550

(51) Int. Cl.
*G06F 3/06*     (2006.01)
*G06F 12/02*    (2006.01)

(52) U.S. Cl.
CPC .......... *G06F 3/0608* (2013.01); *G06F 3/0652* (2013.01); *G06F 3/0673* (2013.01); *G06F 12/0253* (2013.01); *G06F 2212/1044* (2013.01)

(58) Field of Classification Search
CPC .... G06F 3/0608; G06F 3/0652; G06F 3/0673; G06F 12/0253; G06F 2212/1044
See application file for complete search history.

(56) References Cited

U.S. PATENT DOCUMENTS 8,527,544 B1      9/2013  Colgrove et al.
2017/0010809 A1*  1/2017  Hironaka .............. G06F 12/023

* cited by examiner

*Primary Examiner* — Aracelis Ruiz
(74) *Attorney, Agent, or Firm* — Volpe and Koenig, P.C.

(57) ABSTRACT

A computer system connected to an external computer issuing a data input/output request and a storage device, includes a logical storage area of a first layer of the storage device and a logical storage area of a second layer of the external computer. The logical storage area of the first layer includes a common area and an individual area. A storage area of the common area is associated with one or more of the second layer's logical storage areas. A storage area of the individual area is associated with one storage area of the second layer's logical storage area. The computer system performs duplication determination on a plurality of data sets and associates a plurality of data sets determined as being duplicated with the common area to associate the storage area of the common area with a plurality of storage areas of the logical storage area of the second layer.

9 Claims, 21 Drawing Sheets

FIG. 8

VOL MANAGEMENT TABLE
421

| VOL# (801) | VOL ATTRIBUTE (802) | VOL CAPACITY (803) | POOL# (804) |
|---|---|---|---|
| 0 | DISTRIBUTION | 200GB | 0 |
| 10 | ADDITIONAL-WRITING | 200GB | 0 |
| 20 | COMMON | 200GB | 0 |
| ... | ... | ... | ... |

FIG. 9

ADDRESS TRANSLATION TABLE
422

| VOL INTERNAL ADDRESS (901) | REFERENCE DESTINATION VOL# (902) | REFERENCE DESTINATION VOL INTERNAL ADDRESS (903) | DATA SIZE (904) | REFERENCE DESTINATION VOL TYPE (905) |
|---|---|---|---|---|
| 0 | 100 | 10 | 1 | INDIVIDUAL |
| 10 | 100 | 20 | 5 | INDIVIDUAL |
| 20 | 200 | 50 | 10 | COMMON |
| ... | ... | ... | ... | ... |

FIG. 10

VALID AREA MANAGEMENT TABLE
424

| VOL INTERNAL ADDRESS | VALIDNESS FLAG |
|---|---|
| 0 | VALID |
| 10 | VALID |
| 20 | INVALID |
| ... | ... |

FIG. 11

PAGE TRANSLATION TABLE
425

| VOL INTERNAL ADDRESS | ALLOCATION FLAG | PAGE# |
|---|---|---|
| 0 | ALLOCATED | 0 |
| 100 | ALLOCATED | 1 |
| 200 | NOT-ALLOCATED | - |
| ... | ... | |

FIG. 12

PAGE ALLOCATION MANAGEMENT TABLE
426

| PAGE# | ALLOCATION FLAG | ALLOCATION DESTINATION VOL# | ALLOCATION DESTINATION VOL INTERNAL ADDRESS |
|---|---|---|---|
| 1201 | 1202 | 1203 | 1204 |
| 0 | ALLOCATED | 0 | 100 |
| 1 | ALLOCATED | 1 | 200 |
| 2 | NOT-ALLOCATED | - | - |
| ... | ... | ... | ... |

FIG. 13

SUB-BLOCK MANAGEMENT TABLE
427

| PAGE# | PAGE INTERNAL ADDRESS | ALLOCATION FLAG | VOL INTERNAL ADDRESS | SUB-BLOCK SIZE |
|---|---|---|---|---|
| 1301 | 1302 | 1303 | 1304 | 1305 |
| ... | ... | ... | ... | ... |

FIG. 14

ADDITIONAL-WRITING DESTINATION SEARCH TABLE
428

| VOL# | ADDITIONAL-WRITING DESTINATION ADDRESS | END ADDRESS |
|---|---|---|
| 10 | 10 | 10000 |
| ... | ... | ... |

DUPLICATION CHECKING TABLE
489

| TARGET VOL# | TARGET VOL INTERNAL ADDRESS | HASH VALUE | HIT FLAG | COMPARISON DESTINATION VOL# | COMPARISON DESTINATION VOL INTERNAL ADDRESS | COMPARISON SUCCESS FLAG | STORAGE DESTINATION VOL# | STORAGE DESTINATION VOL INTERNAL ADDRESS |
|---|---|---|---|---|---|---|---|---|
| 0 | 0 | 1111 | Hit | 1 | 0 | SUCCESS | - | - |
| ... | ... | ... | ... | ... | ... | ... | ... | ... |

1501, 1502, 1503, 1504, 1505, 1506, 1507, 1508, 1509

HASH MANAGEMENT TABLE
429

| HASH VALUE (1601) | REGISTRATION FLAG (1602) | VOL# (1603) | VOL INTERNAL ADDRESS (1604) |
|---|---|---|---|
| 0 | PRESENCE | 0 | 100 |
| 1 | PRESENCE | 1 | 50 |
| 2 | PRESENCE | 1 | 30 |
| 3 | ABSENCE | - | - |
| ... | ... | ... | ... |

DUPLICATION MANAGEMENT TABLE
430

FIG. 18
COMMON AREA ALLOCATION MANAGEMENT TABLE
431

| VOL INTERNAL ADDRESS (1801) | USE FLAG (1802) |
| --- | --- |
| 0 | IN-USE |
| 1 | UNUSED |
| 2 | UNUSED |
| 3 | IN-USE |
| ... | ... |

FIG. 19
COMMON AREA CHECKING TABLE
432

| VOL INTERNAL ADDRESS (1901) | REFERENCE FLAG (1902) |
| --- | --- |
| 0 | PRESENCE |
| 1 | ABSENCE |
| 2 | ABSENCE |
| 3 | PRESENCE |
| ... | ... |

COMPUTER SYSTEM HAVING DATA AMOUNT REDUCTION FUNCTION AND STORAGE CONTROL METHOD

TECHNICAL FIELD

The present invention, generally, relates to storage control in a computer system having a data amount reduction function.

BACKGROUND ART

There is a storage system as one example of a computer system. As a storage system having a data amount reduction function, for example, a storage system disclosed in U.S. Pat. No. 8,527,544, in other words, a storage system having a garbage collection function is known. In U.S. Pat. No. 8,527,544, the following is disclosed.

A storage system includes a memory device and a storage controller having a garbage collection function. The storage controller manages mapping between a virtual address and a physical address of the memory device. When write for a virtual address occurs, the storage controller performs mapping update (update of an address translation table) of mapping a free physical address of a new write destination for the virtual address instead of a physical address that has already been allocated thereto. As a result, invalid data (data according to a physical address of which mapping for a virtual address has been released) increases. The storage controller executes garbage collection of copying valid data (data according to each physical address mapping into one virtual address) and deleting invalid data. Accordingly, the amount of data is reduced, and the number of free physical addresses (free area) increases.

SUMMARY OF INVENTION

Technical Problem

Generally, in a storage system, there are a plurality of layers of a logical storage area. Hereinafter, a logical storage area of a first layer among a plurality of layers will be referred to as a "first logical storage area," and a logical storage area of a second layer of the plurality of layers will be referred to as a "second logical storage area." The second layer is a higher layer than the first layer. The first logical storage area is configured by a plurality of part areas. The second logical storage area, for example, is a virtual volume (virtual logical volume) conforming to thin provisioning. In such a case, the first logical storage area is a pool configured by a plurality of pages (one example of part areas) allocated to a virtual volume.

As one of a data amount reduction function, there is a deduplication function. The deduplication function, generally, is a function of setting reference destinations of a plurality of logical addresses as a part area in which one data set (duplicate data set) among a plurality of data sets is stored and deleting the remaining data sets in a case where duplication of a plurality of data sets corresponding to the plurality of logical addresses (a plurality of different write destinations in two or more second logical storage areas) is detected.

In a part area, a duplicate data set and an individual data set (a data set having no duplication with any other data set) may be mixed.

For this reason, it is difficult to appropriately recover (set as an unused part area) a part area that has been allocated in a speedy manner. For example, there is a case in which a part area allocated to the second logical storage area that is a deletion target is recovered as a recovery of a part area, and, in such a case, it is necessary to determine each data set inside a part area that is a recovery target as one of a duplicate data set and an individual data set. In addition, for example, as a recovery of a part area, while there is a recovery of a part area that is a copy source by copying valid data sets (data sets inside an area that is a reference destination of one logical address) between part areas (garbage collection process), in a case where a duplicate data set is a valid data set, it is necessary to perform update of a reference destination for a plurality of logical addresses.

In addition, it may be difficult to copy data sets between part areas in a speedy manner. The reason for this is that, in a case where a data set that is a copy target is a duplicate data set, as described above, it is necessary to update reference destinations for a plurality of logical addresses. In addition, "copying" may be any one of "replication" for which a data set remains in a copy source and migration for which a data set is deleted from a copy source.

There may be a similar problem also in a case where a server system (for example, a server including an auxiliary storage device such as a hard disk drive) having a data amount reduction function is employed as one example of the computer system.

Solution to Problem

In a computer system connected to an external computer issuing a data input/output request and a storage device storing data, logical storage areas of a plurality of layers include a logical storage area of a first layer of the storage device side and a logical storage area of a second layer of the external computer side. The logical storage area of the first layer includes a common area and an individual area. A storage area of the common area is associated with one or a plurality of storage areas of the logical storage area of the second layer. A storage area of the individual area is associated with one storage area of the logical storage area of the second layer. The computer system performs duplication determination on a plurality of data sets and associates a plurality of data sets determined as being duplicated with the common area to associate the storage area of the common area with a plurality of storage areas of the logical storage area of the second layer.

Advantageous Effects of Invention

For an individual area, recovery of a storage area and copying of a data set between storage areas can be performed in a speedy manner.

BRIEF DESCRIPTION OF DRAWINGS

FIG. 8 illustrates a configuration of a VOL management table;

FIG. 9 illustrates a configuration of an address translation table;

FIG. 10 illustrates a configuration of a valid area management table;

FIG. 11 illustrates a configuration of a page translation table;

FIG. 12 illustrates a configuration of a page allocation management table;

FIG. 13 illustrates a configuration of a sub-block management table;

FIG. 14 illustrates a configuration of an additional-writing destination search table;

FIG. 15 illustrates a configuration of a duplication checking table;

FIG. 18 illustrates a configuration of a common area allocation management table;

FIG. 19 illustrates a configuration of a common area checking table;

DESCRIPTION OF EMBODIMENTS

Figure 1:
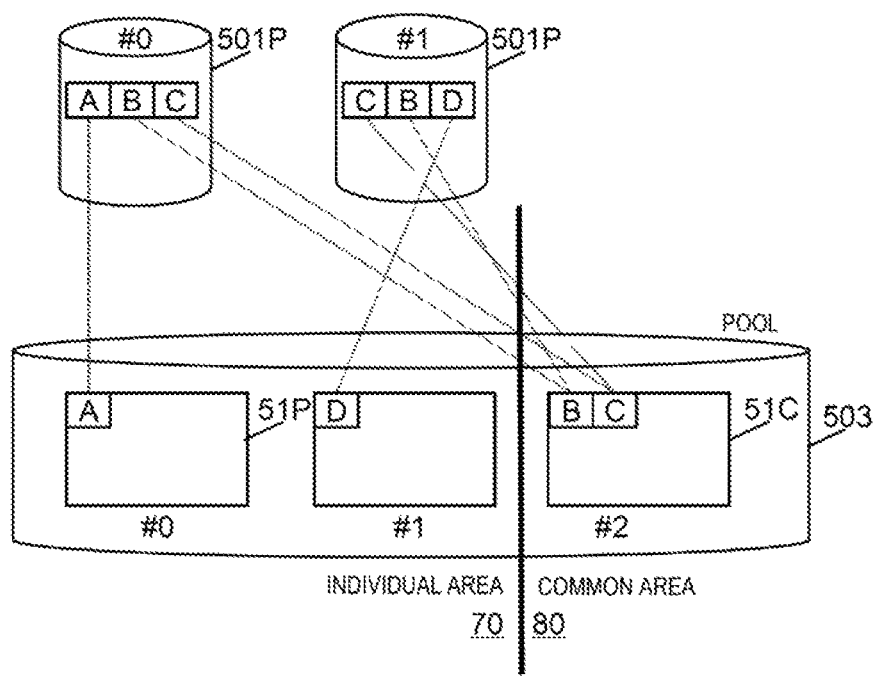
FIG. 1 illustrates an overview of an embodiment of the invention.

In the following description, an "interface unit" may be one or more interfaces. The one or more interfaces may be one or more communication interface devices of a same type (for example, one or more network interface cards (NIC) or two or more communication interfaces of different types (for example, an NIC and a host bus adapter (HBA)).

In addition, in the following description, a "memory unit" is one or more memories and typically may be a main storage device. At least one memory included in a memory unit may be a volatile memory or a nonvolatile memory.

In the following description, a "PDEV unit" is one or more PDEVs and, typically, may be an auxiliary storage device. A "PDEV" represents a physical storage device and, typically, a nonvolatile storage device, for example, a hard disk drive (HDD) or a solid state drive (SSD).

In the following description, a "storage unit" is at least one (typically, at least a memory unit) of a memory unit and at least a part of a PDEV unit.

In the following description, a "processor unit" is one or more processors. At least one processor, typically, is a microprocessor such as a central processing unit (CPU) and may be a processor of a different type such as graphics processing unit (GPU). At least one processor may be a single core or a multi-core. At least one processor may be a processor in a broad sense such as a hardware circuit (for example, a field-programmable gate array (FPGA) or an application specific integrated circuit (ASIC) executing a part or the whole of a process.

In the following description, in a representation of "xxx table," information used for acquiring an output for an input may be described, and the information may be data having any structure and may be a learning model such as a neural network that generates an output for an input. Thus, "xxx table" may be referred to as "xxx information." In the following description, the configuration of each table is one example, and thus, one table may be divided into two or more tables, and all or a part of two or more tables may be configured as one table.

In the following description, although a process may be described using a "program" as a subject, the program is executed by a processor unit and executes a set process by appropriately using a storage unit and/or an interface unit, and the like, and accordingly, the subject of a process may be regarded as a processor unit (or a device such as a controller including the processor unit). A program may be installed from a program source to a device such as a computer. A program source, for example, may be a (for example, a non-transitory) recording medium that can be read by a program distributing server or a computer. In the following description, two or more programs may be realized as one program, and one program may be realized as two or more programs.

In the following description, a "computer system" is a system that includes one or more physical computers. A physical computer may be either a general-purpose computer or a dedicated computer. A physical computer may function as a computer (for example, a host computer) that issues an input/output (I/O) request or function a computer (for example, a storage device) that performs I/O of data in response to an I/O request. In other words, a computer system may be at least one of a host system that is one or more host computers issuing I/O requests and a storage system that is one or more storage devices performing I/O of data in response to I/O requests. In at least one or more physical computers, one or more computers (for example, virtual machines (VM)) may be executed. A virtual computer may be a computer that issues an I/O request or a computer that performs I/O of data in response to an I/O request.

A computer system may be a distributed system configured by one or more (typically, a plurality of) physical node devices. A physical node device is a physical computer.

By executing predetermined software using a physical computer (for example, a node device), software-defined anything (SDx) may be built in the physical computer or a computer system including the physical computer. As the SDx, for example, a software defined storage (SDS) or a software-defined data center (SDDC) may be employed. For example, by executing software having a storage function using a physical general-purpose computer, a storage system as an SDS may be built. At least one physical computer (for example, a storage device) may be executed as one or more virtual computers as a host system and a virtual computer as a storage controller of a storage system (typically, a device that inputs/outputs data to/from a PDEV unit in response to an I/O request). In other words, at least one physical computer may have both a function as at least a part of a host system and a function as at least a part of a storage system.

A computer system (typically, a storage system) may include a redundant configuration group. A redundant configuration may be a configuration in a plurality of node devices such as erasure coding, a redundant array of independent nodes (RAIN), and mirroring between nodes and may be a configuration in a single computer (for example, a node device) such as one or more redundant arrays of independent (or inexpensive) disks (RAID) group as at least a part of a PDEV unit.

In the following description, a "data set" is a block of one logical electronic data seen from a program such as an application program and, for example, may be one of a record, a file, a key value pair, and a tuple.

In the following description, while an identification number is used as identification information of various targets, identification information (for example, an identifier including alphabets and codes) of a type other than the identification number may be employed.

In the following description, in a case where elements of a same type are described without being distinguished from each other, a reference sign (or a common sign included in a reference sign) may be used, and, in a case where elements of a same type are described with being distinguished from each other, an identification number (or a reference sign) of the elements may be used. For example, in a case where one of pages is described without being distinguished, "page 51" is represented, and, in a case where individual pages are described with being distinguished from each other, "page 0" and "page 1" or "page 51P" and "page 51C" may be represented.

Hereinafter, one embodiment of the invention will be described with reference to the drawings.

FIG. 1 illustrates an overview of an embodiment of the invention.

As one example of a computer system, a storage system 200 is employed. In the storage system 200, there are a plurality of layers of a logical storage area (logical address space). One example of one or more first logical storage areas belonging to a first layer is one or more pools 503. One example of a plurality of second logical storage areas belonging to a second layer (an upper layer of the first layer) is a plurality of logical volumes 501. The logical volume 501 is a virtual logical volume conforming to a volume virtualization technology (typically, thin provisioning). An unallocated (free) page 51 of the pool 503 may be allocated to a logical address, which is a write destination, of the logical volume 501.

The storage system 200 includes a storage controller 101. The storage controller 101 is one example of a controller that includes a processor unit. The storage controller 101 has a deduplication function as a data amount reduction function.

In this embodiment, a common area 80 that is a space in which duplicate data sets are stored and an individual area 70 that is a space in which individual data sets are store are prepared. In other words, a logical address space of the storage system 200 is logically divided into the common area 80 and the individual area 70. For example, each of a plurality of logical volumes 501 includes two or more distribution volumes 501P that are two or more logical volumes that can be recognized as I/O sources.

The storage controller 101 performs a duplication determining process of determining whether or not a target data set according to a write request having a distribution volume 0 as a write destination is a data set of duplication for one of one or more data sets. The duplication determining process may be any one of a process (in-process) performed in a process of the write request and a process (post-process) performed asynchronously with a process of the write request after a target data set according to the write request is stored. A plurality of data sets that are targets for the duplication determining process include at least two data sets among a data set according to the write request, a data set associated with the individual area 70, and a data set associated with the common area 80. In other words, in a case where duplicate data sets are already present inside the storage system 200, there may be cases in which three or more data sets are duplicated. In a duplication determining process in an in-process, it is determined whether or not a data set according to a write request has duplication with a data set associated with the individual area 70 or a data set associated with the common area 80. In a case where duplication is determined, the data set according to the write request is deleted (de-duplicated), and accordingly, it is unnecessary to delete a data set in the individual area 70 (for example, recover an individual page 51P to be described later).

As a result of the duplication determining process, in a case where the target data set is an individual data set A having no duplication with any data set, the storage controller 101 sets a storage destination of the data set A as a page 0 that belongs to the individual area 70 and corresponding to a distribution volume 0. Hereinafter, a page belonging to the individual area 70 may be referred to as an "individual page." According to the example illustrated in FIG. 1, each of pages 0 and 1 is an individual page 51P.

As a result of the duplication determining process, in a case where the target data set is a data set B (or C) having duplication with one of one or more data sets, the storage controller 101 sets a storage destination of the duplicate data set B (or C) as a page 2 belonging to the common area 80. The page 2 is directly or indirectly referred to from a plurality of write destinations (distribution volume 0 or 1) of the duplicate data sets B and C. Hereinafter, a page belonging to the common area 80 may be referred to as a "common page." According to the example illustrated in FIG. 1, a page 2 is the common page 51C. In a case where the duplication determining process is a post-process, the storage controller 101 copies data sets B and C from a plurality of individual pages 0 and 1 allocated to distribution volumes 0 and 1 to the common page 2 and deletes the data sets B and C from the plurality of individual pages 0 and 1.

Figure 2:
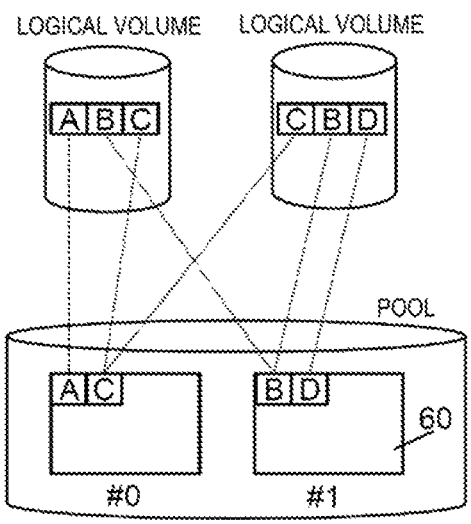
FIG. 2 illustrates an overview of a first comparative example.

Accordingly, an occurrence of a status as illustrated in the first comparative example of FIG. 2, in other words, an occurrence of a status in which an individual data set A and a duplicate data set C are mixed in one page 60 can be avoided, and recovery of a page 51 and copying of a data set between pages 51 can be quickly performed for the individual page 51P.

For example, in a case where a distribution volume 0 is set as a deletion target, the storage controller 101 releases all the individual pages 51P that are allocated to the distribution volume 0 without checking whether or not any one of individual pages 51P is referred to from another area for each of all the individual pages 51P and without checking whether or not any one area in the distribution volume 0 refers to the common area 80. For this reason, all the individual pages 51P allocated to the distribution volume 0 can be quickly recovered.

In addition, for example, in a garbage collection process of individual pages 51P, the storage controller 101 copies all the valid individual data sets in the individual pages 51P to another different page 51 in an additional-writing manner and releases allocation of the page 51P that is a copy source. Relating to individual pages 51P, data sets copied between the pages 51 are not duplicate data sets but individual data sets. Thus, update of the reference destination may be performed only for one logical address (a logical address belonging to the distribution volume 501P) of the individual data set and does not need to be performed for each of a plurality of logical addresses. For this reason, copying a data set from the individual page 51P to another page 51 can be quickly performed, and, as a result, the garbage collection process of the individual pages 51P is efficiently performed.

Here, this embodiment will be described in detail.

Figure 3:
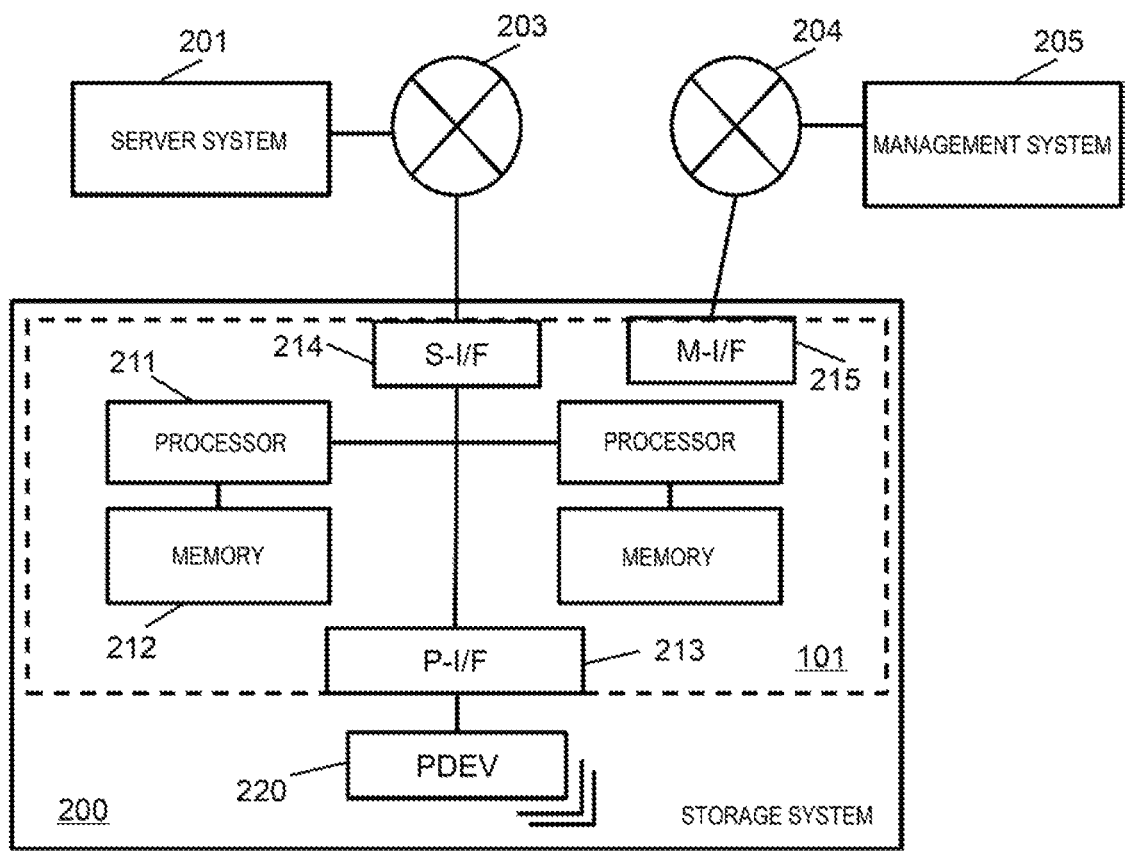
FIG. 3 illustrates a configuration of an entire system including a storage system.

FIG. 3 illustrates the configuration of an entire system including the storage system 200.

The storage system 200 includes (one or) a plurality of PDEVs 220 and a storage controller 101 that is connected to the plurality of PDEVs 220.

The storage controller 101 includes an S-I/F 214, an M-I/F 215, a P-I/F 213, and a memory 212, and a processor 211 connected thereto. The S-I/F 214, the M-I/F 215, and the P-I/F 213 are examples of an interface unit. In addition, the memory 212 is one example of a storage unit. The processor 211 is one example of a processor unit. The processor unit may include a hardware circuit that compresses and decompresses data. In this embodiment, the processor 211 executes compression and decompression. In other words, the storage controller 101 has a compression function in addition to a deduplication function as data amount reduction functions.

The S-I/F 214 is a communication interface device relaying exchange of data between the server system 201 and the storage controller 101. The server system 201 is connected to the S-I/F 214 through a fibre channel (FC) network 203. The server system 201 transmits an I/O request (a write request or a read request) designating an I/O destination (for example, a logical volume number such as a logical unit number (LUN) or a logical address such as a logical block address (LBA) to the storage controller 101.

The M-I/F 215 is a communication interface device relaying exchange of data between the management system 205 and the storage controller 101. The management system 205 is connected to the M-I/F 215 through an Internet protocol (IP) network 204. The networks 203 and 204 may be the same communication network. The management system 205 manages the storage system 200.

The P-I/F 213 is a communication interface device relaying exchange of data between a plurality of PDEVs 220 and the storage controller 101. The plurality of PDEVs 220 are connected to the P-I/F 213.

The memory 212 stores a program executed by the processor 211 or data used by the processor 211. The processor 211 executes a program that is stored in the memory 212. In this embodiment, for example, a set of the memory 212 and the processor 211 are duplicated.

Figure 4:
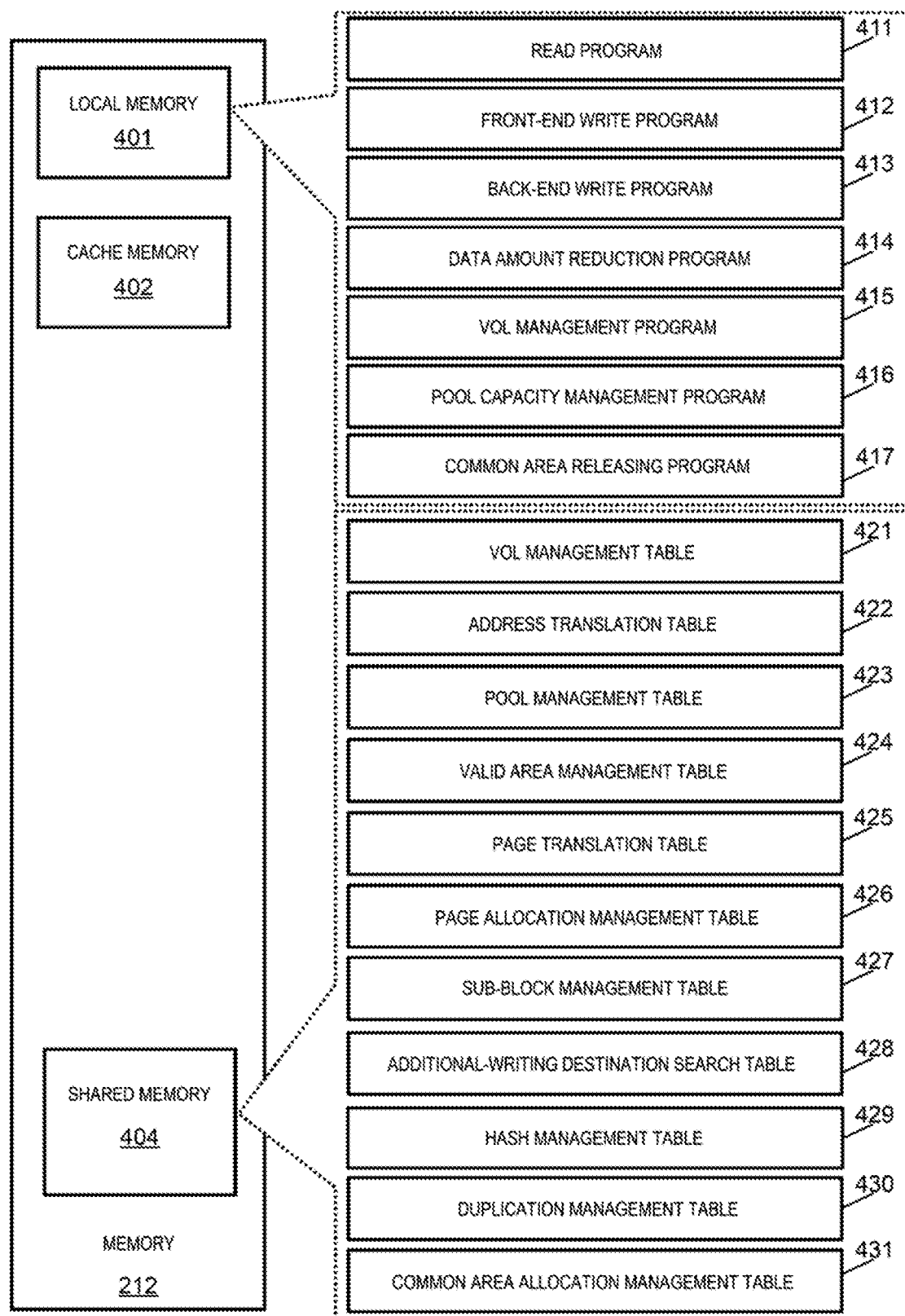
FIG. 4 illustrates a configuration of a memory inside a storage controller and programs and management information inside the memory.

FIG. 4 illustrates the configuration of the memory 212 and programs and management information inside the memory 212.

The memory 212 includes memory areas such as a local memory 401, a cache memory 402, and a shared memory 404. At least one of such memory areas may be an independent memory.

The local memory 401 is used by the processor 211 belonging to the same set as that of the memory 212 including this local memory 401. In the local memory 401, a read program 411, a front-end write program 412, a back-end write program 413, a data amount reduction program 414, a VOL management program 415, a pool capacity management program 416, and a common area releasing program 417 are stored. Such programs will be described later.

In the cache memory 402, a data set that is written/read into/from the PDEV 220 is temporarily stored.

The shared memory 404 is used by both the processor 211 belonging to the same set as that of the memory 212 including this shared memory 404 and the processor 211 belonging to a different set. In the shared memory 404, management information is stored. The management information includes a VOL management table 421, an address translation table 422 (one example of deduplication information), a pool management table 423, a valid area management table 424, a page translation table 425, a page allocation management table 426, a sub-block management table 427, an additional-writing destination search table 428, a hash management table 429, a duplication management table 430, and a common area allocation management table 431. Among such tables, tables other than the pool management table 423 will be described later with reference to the drawings. The pool management table 423 is a table that stores information relating to the pool 503 and, for example, for each pool 503, includes pool # (a number of the pool 503), RG # (a number of one or more RGs 504 that are bases of the pool 503), a pool capacity (the capacity of the pool 503), and a pool used capacity (a used capacity in a full capacity (typically, a total capacity of allocated pages in the pool 503)).

Figure 5:
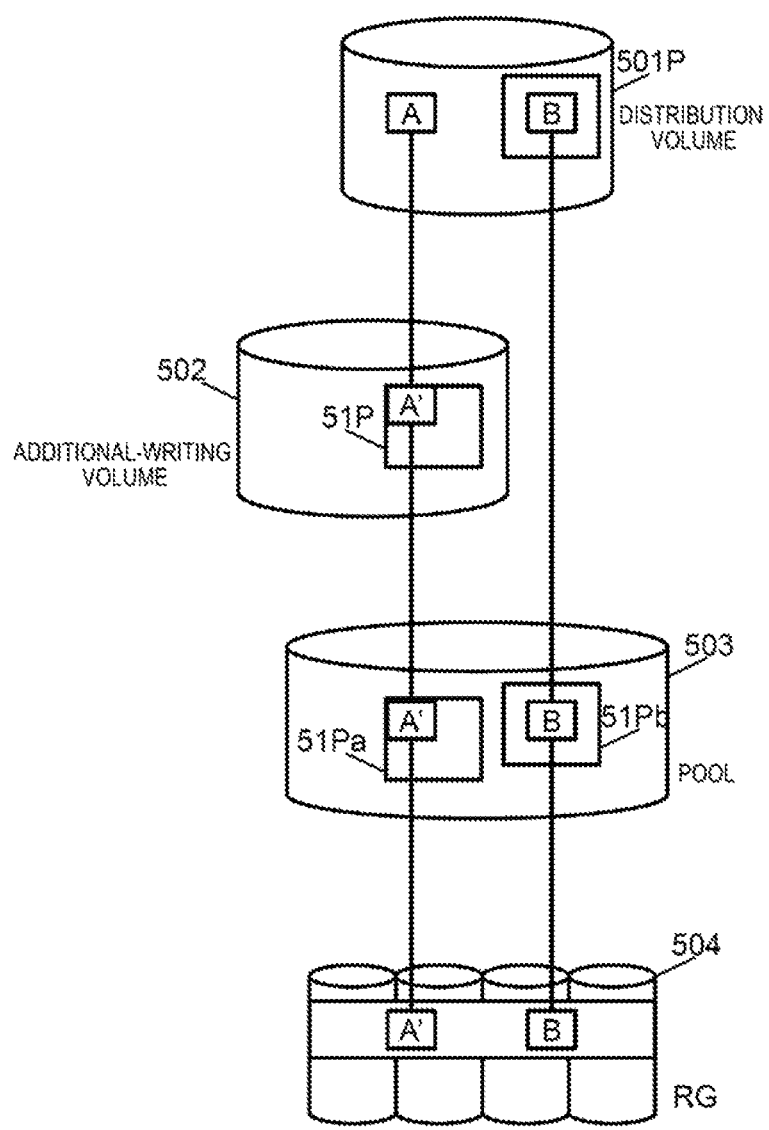
FIG. 5 illustrates a storage hierarchy inside the storage system.

FIG. 5 illustrates a storage hierarchy inside the storage system 200. In the following description, an n-th layer will be referred to as a "layer n" (here, n is a natural number). As n is smaller, the layer is a higher layer.

There are a distribution volume 501P, an additional-writing volume 502, a pool 503, and an RG 504.

The distribution volume 501P is a logical storage area of a layer 1 (one example of a second layer) and is the logical volume described above provided for the server system 201 (visible from the server system 201). In addition, as a logical storage area of the layer 1, in this embodiment, as will be described later, there is a common volume that is a logical volume belonging to the common area 80 and is not provided for the server system 201 (non-visible from the server system 201).

The additional-writing volume 502 is a logical storage area of a layer 2 (one example of a third layer) and is a logical volume for additional-writing. One logical volume 501 is associated with one additional-writing volume 502. On the other hand, one or a plurality of additional-writing volumes 502 are associated with one logical volume 501. Thus, the additional-writing volume 502 (a logical storage area of the layer 2) and the logical volume 501 (a logical storage area of the layer 1) have one-to-one or one-to-many relation. In this embodiment, for simplification of description, the additional-writing volume 502 and the logical volume 501 have one-to-one relation.

The pool 503 is a logical storage area of a layer 3 (one example of the first layer) and is a logical storage area based on one or more RGs 504. The pool 503 is configured by a plurality of pages 51. In addition, a part or the whole of the pool 503 may be on the basis of an external storage resource of the storage system 200 instead of or additional to at least one RG 504.

The RG 504 is a logical storage area of a layer 4 and is a space of a RAID group configured by a plurality of PDEVs 220.

A part of the distribution volume 501P illustrated in FIG. 5 as an example is at least a part of two or more distribution volumes 501P and a part or the whole of a "valid area" that is an area in which compression is valid. In the two or more distribution volumes 501P, an area other than the valid area is referred to as an "invalid area" that represents an area in which compression is invalid. In a case where a write destination of a data set A that is a write target is a valid area, the storage controller 101 compresses the data set A that is the write target and additionally writes the compressed data set A' in a page 51Pa (an individual page 51Pa allocated to the write destination) allocated to the additional-writing volume 502 corresponding to the distribution volume 501P. In other words, for a valid area, the page 51Pa is a page 51 allocated to the additional-writing volume 502 corresponding to the distribution volume 501P, in other words, a page 51 that is indirectly allocated to the distribution volume 501P. In the page 51Pa, the additionally-writing compressed data set A' is stored. In other words, the page 51 allocated to the additional-writing volume 502 is non-rewritable. A page allocated to the additional-writing volume 502 (a page that is indirectly allocated to the distribution volume 501P) may be referred to as an "additional-writing page."

On the other hand, in a case where a write destination of a data set B that is a write target is an invalid area, the storage controller 101 stores the non-compressed data set B in a page 51Pb allocated to the write destination without compressing the data set B that is the write target. In other words, for an invalid area, the page 51Pb is a page 51 that is directly allocated to the distribution volume 501P (not through the additional-writing volume 502). In the page 51Pb, the non-compressed data set B is stored. The page 51 that is directly allocated to the distribution volume 501P is rewritable. A page that is directly allocated to the distribution volume 501P may be referred to as a "rewriting page."

Figure 6:
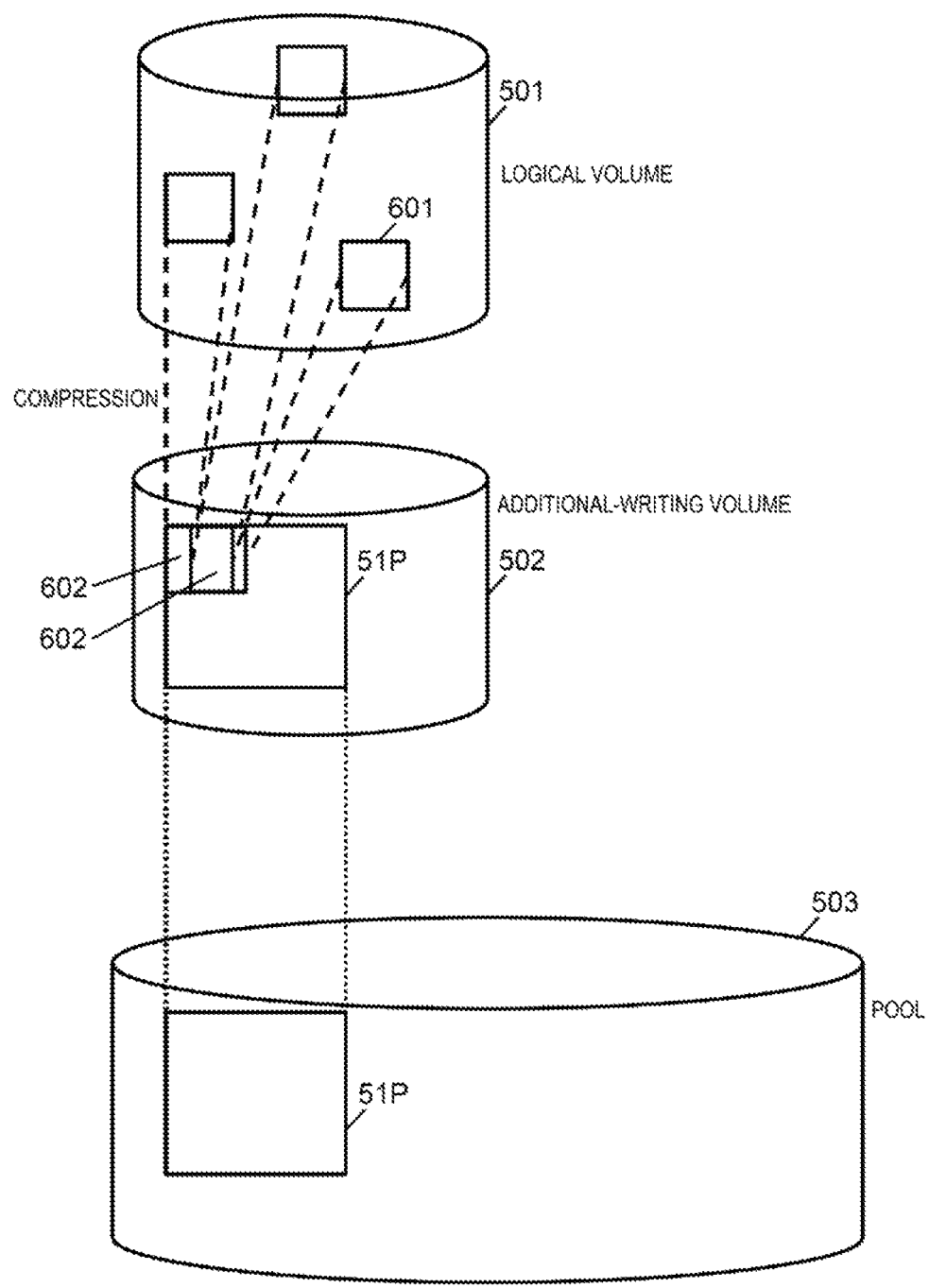
FIG. 6 schematically illustrates additional-writing toward an additional-writing page.

FIG. 6 schematically illustrates additional-writing toward an additional-writing page 51.

The logical volume 501 is configured by a plurality of blocks 601 that are a plurality of unit areas. In this embodiment, a data set is data in units of blocks.

In the additional-writing page 51P allocated to the additional-writing volume 502 corresponding to the logical volume 501, a compressed data set is additionally written. In the additional-writing page 51P, an area 602 occupied by the compressed data set will be referred to as a "sub-block 602" In the following description. The sub-block 602 is one example of each of a subpage area and subpart area. In the additional-writing page 51P, a non-compressed data set may be additionally written, in this embodiment, a compressed data set is additionally written.

Figure 7:
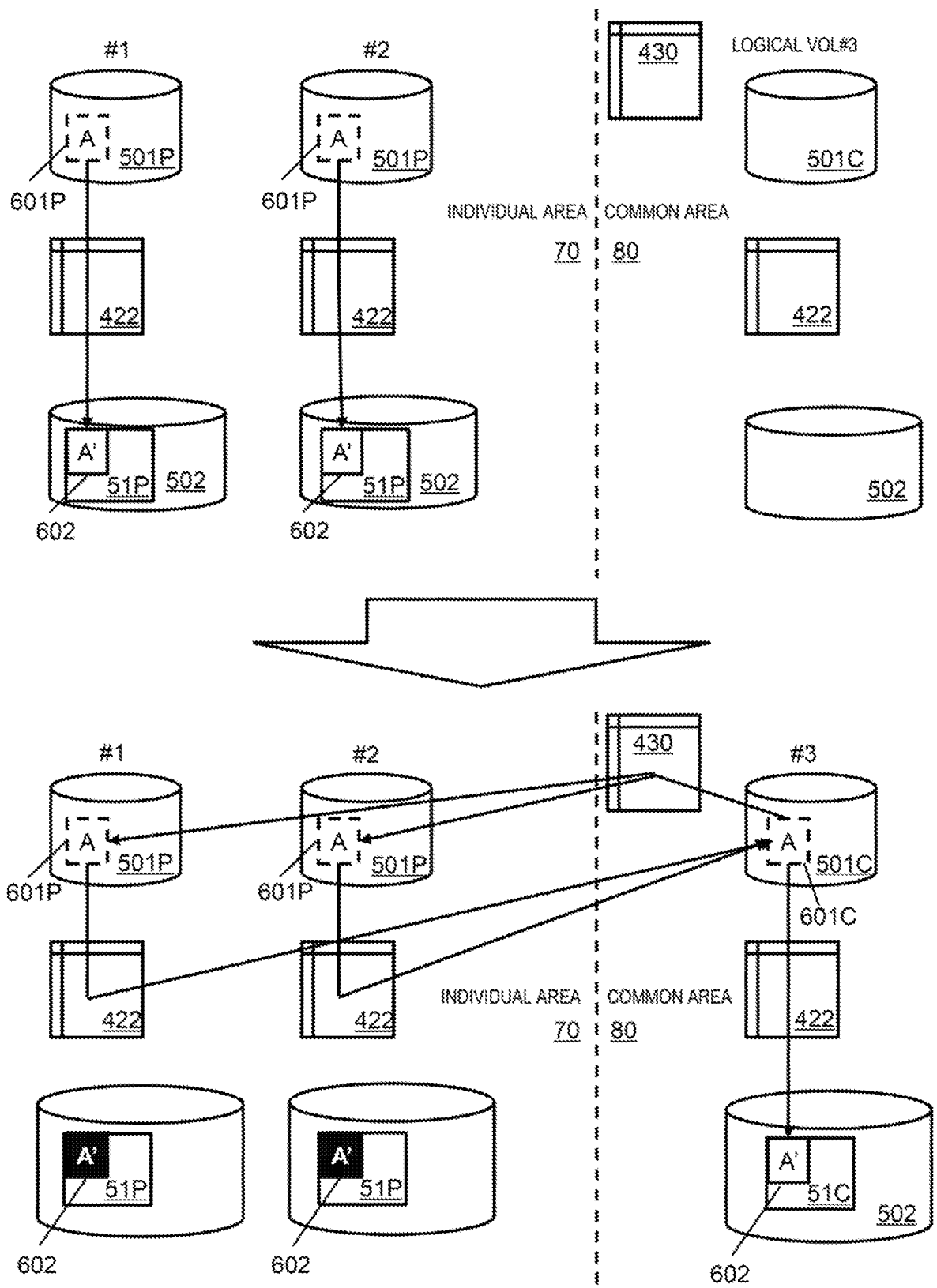
FIG. 7 schematically illustrates a deduplication process.

FIG. 7 schematically illustrates a deduplication process. More specifically, FIG. 7 schematically illustrates one example of a deduplication process of a post-process.

As logical volumes 501, there is a common volume 501C in addition to a distribution volume 501P. The common volume 501C, as described above, is a logical volume that belongs to the common area 80 and is not provided for the server system 201. At least a part of the common volume 501C illustrated in the drawing is a valid area. In addition, a common volume belonging to a valid area and a common volume belonging to an invalid area may be prepared.

The address translation table 422 and the additional-writing volume 502 are disposed for each logical volume 501. In description with reference to FIG. 7, the address translation table 422 corresponding to a logical volume m (a logical volume of VOL # "m" (here, m is an integer or "0" or more)) may be referred to as an "address translation table m." In description with reference to FIG. 7, an additional-writing volume 502 corresponding to the logical volume m may be referred to as an "additional-writing volume m."

In the following description, terms described below may be used.

Distribution block: block in distribution volume
Common block: block in common volume
Duplication destination block: common block set as a write destination (copy destination) of duplicate data set
Additional-writing individual page: page that is an individual page and is an additional-writing page
Additional-writing common page: page that is a common page and is an additional-writing page (a page allocated to an additional-writing volume corresponding to a common volume)

There are distribution volumes 1 and 2, and thus there are address translation tables 1 and 2 and additional-writing volumes 1 and 2. In addition, there is a common volume 3, and thus there is an address translation table 3 and an additional-writing volume 3. The additional-writing volumes 1 and 2 belong to the individual area 70, and the additional-writing volume 3 belongs to the common area 80.

One example of a status before the deduplication process, as illustrated on the upper side in FIG. 7, is as described below.

In each of two distribution blocks 601P included in distribution volumes 1 and 2, a data set A is present. As a result, in each of two additional-writing individual pages 51P respectively allocated to the additional-writing volumes 1 and 2, a compressed data set A' is present.

In each of address translation tables 1 and 2, a reference destination of the logical address of the distribution block 601P that is a write destination of the data set A is a logical address of a sub-block 602 (a sub-block 602 in which the compressed data set A' is present) in the additional-writing individual page 51P.

In the duplication determining process described above, the storage controller 101 detects that the duplicate data set A is present in the distribution volumes 1 and 2. In such a case, the storage controller 101, for example, performs the deduplication process including the following process.

The storage controller 101 copies the duplicate data set A (corresponding to an uncompressed data set of the compressed data set A') from the distribution block 601P of a valid area in the distribution volumes 1 and 2 to one unused common block 601C in a valid area of the common volume 3. The common block 601C that is the copy destination is a duplication destination block 601C (one example of a duplication destination area).

The storage controller 101 allocates the page 51 to the additional-writing volume 3 corresponding to the duplication destination block 601C. The allocated page 51 is an additional-writing common page 51C.

The storage controller 101 compresses the duplicate data set A and additionally writes the compressed data set A' into the additional-writing common page 51C.

The storage controller 101 updates the address translation table 3. In the address translation table 3 after update, the reference destination of the logical address of the duplication destination block 601C is the logical address of a sub-block 602 (a sub-block 602 in which the compressed data set A' is present) in the additional-writing common page 51C.

The storage controller 101 updates the address translation tables 1 and 2. In each of the address translation tables 1 and 2 after update, the reference destination of the logical address of the distribution block 601P is the logical address of the duplication destination block 601C instead of the logical address of the sub-block 602 (the sub-block 602 in which the compressed data set A' is present) in the additional-writing individual page 51P.

The storage controller 101 manages the sub-block 602 in which the compressed data set A' is stored out of two additional-writing individual pages 51P respectively allocated to the additional-writing volumes 1 and 2, as denoted in block, as an invalid sub-block (unallocated).

The storage controller 101 updates the duplication management table 430. In the duplication management table 430 after update, the reference sources of the logical address of the duplication destination block 601C are the logical addresses of two distribution blocks 601P of the copy source.

As above, one example of the deduplication process has been described. In addition, there may be one reference source inside the individual area 70 referring to the data set in the common area 80, and the data set may not be moved to the individual area 70 (the data set may continuously remain in the common area 80). In the deduplication process, the storage controller 101, instead of copying the duplicate data set A to the common block 601C, may copy one compressed data set A' to the page 51C belonging to the common area 80 in an additional-writing manner and sets the reference destination of the logical addresses of the two distribution blocks 601P as the logical address of the sub-block 602 of the copy destination page 51C, and set the sub-block 602 of the copy source as an invalid sub-block. In a case where such a process is employed, the common volume 501C may not be present.

The storage controller 101, for example, is assumed to receive a write request for writing a data set F after update into a write destination distribution block 601P of the data set A in the distribution volume 1. In this case, for an additional-writing individual page 51P of the additional-writing volume 1, the following (c1) to (c3) are executed. (c2) is a process performed in a case where the write request is received before the deduplication process. (c3) is a process performed in a case where the write request is received after the deduplication process.

(c1) The storage controller 101 determines whether or not the reference source (old reference source) of the old sub-block 602 is the logical address of one distribution block 601P of the distribution volume 1. Here, the "old sub-block" is a sub-block in which compressed data set A' before update of the compresses data set F' that is a write target is stored. Here, the "compressed data set F' that is the write target" is a compressed data set of the data set F that is a write target for the write destination distribution block 601P.

(c2) In a case where a result of the determination of (c1) is "Yes," since the old sub-block 602 is present in the additional-writing individual page 51P, the storage controller 101 sets the old sub-block 602 as an invalid sub-block (unused sub-block), additionally writes compressed data set F' that is a write target into a new sub-block, and changes the reference destination of the logical address of the write destination distribution block 601P from the logical address of the old sub-block 602 to the logical address of the new sub-block.

(c3) In a case where a result of the determination of (c1) is "No," the old sub-block 602 is present in the additional-writing common page 51C, and accordingly, the storage controller 101 additionally writes the compressed data set F' that is a write target into a new sub-block of the additional-writing individual page 51C without setting the old sub-block 602 as being an invalid sub-block, and changes the reference destination of the logical address of the write destination distribution block from the logical address of the duplication destination block 601C to the logical address of the new sub-block.

For this reason, statuses (x1) and (x2) as below may occur.

(x1): In the additional-writing individual page 51P, logical addresses of valid compressed data sets (valid sub-blocks 602) become non-continuous (a valid compressed data set is in a discrete state).

(x2): Although the duplication destination block 601C of the common volume 501C is not referred to from the distribution block 601P of any distribution volume 501P, the duplication destination block 601C remains as being used, and, as a result, a free space of the common volume 501C does not increase, and an unnecessary compressed data block continuously remains in the common page 51C.

Since the status (x1) may occur, a garbage collection process is necessary for the individual area 70. In this embodiment, the garbage collection process for the individual area 70 can be efficiently performed. The reason for this is that, any valid compressed data set is a compressed data set of an individual data set in the garbage collection process, and thus, there is one reference source for each valid compressed data set, and the reference destination of only the one reference source needs to be changed.

Since the status (x2) may occur, the storage controller 101 performs a releasing process for setting the duplication destination block 601C as being unused. More specifically, in the releasing process, the storage controller 101 a reference source block 601P of which the reference destination is not the duplication destination block 601C is excluded from one or more reference source blocks 601P (one or more distribution blocks 601P of one or more distribution volumes 501P) of the duplication destination block 601C. In a case where all the reference source blocks 601P are excluded, and accordingly, there is no reference source having the duplication destination block 601C as a reference destination, the storage controller 101 releases the duplication destination block 601C as being unused. Accordingly, the storage controller 101 sets the sub-block 602 (the sub-block 602 inside the common page 51C) of the duplication destination block 601C as an invalid sub-block. In addition, in a case where there is only one reference source block 601P of the duplication destination block 601C in the common volume 501C, the storage controller 101 may perform any one of the followings.

The storage controller 101 copies a compressed data set corresponding to the duplication destination block 601C from the common page 51C to an additional-writing page 51P corresponding to the distribution volume 501P including the reference source block 601P in an additional-writing manner, sets the sub-block 602 of the copy source (the sub-block 602 of the common page 51C) as being unused (unallocated), and sets the duplication destination block 601C as being unused. Accordingly, the free space of the common volume 501C can be increased.

The storage controller 101 causes a compressed data set corresponding to the duplication destination block 601C to remain to be stored in the common page 51C. Accordingly, the occurrence frequency of copying between pages 51 can be decreased.

Hereinafter, several tables will be described.

FIG. 8 illustrates the configuration of the VOL management table 421.

In this embodiment, a logical volume such as the distribution volume 501P that is provided for the server system 201 and logical volumes such as the common volume 501C and the additional-writing volume 502 that are not provided for the server system 201 may be collectively referred to as "VOL." The VOL management table 421 stores information relating to the VOLs. For example, the VOL management table 421 includes an entry for each VOL. Each entry stores information of VOL # 801, a VOL attribute 802, a VOL capacity 803, and pool # 804. Hereinafter, one VOL (a "target VOL" in description with reference to FIG. 8) will be taken as an example.

VOL # 801 represents a number (identification number) of the target VOL. The VOL attribute 802 represents an attribute of the target VOL (for example, a distribution volume is "distribution," an additional-writing volume is "additional-writing," and a common volume is "common"). The VOL capacity 803 represents a capacity of the target VOL. Pool #804 represents a number of the pool 503 associated with the target VOL.

FIG. 9 illustrates the configuration of the address translation table 422.

The address translation table 422 is present for each logical volume 501 (a logical volume of the layer 1). The address translation table 422 stores information relating to a relation between a logical address of a reference source and a logical address of a reference destination. For example, the address translation table 422 includes an entry for each block 601. Each entry stores information of a VOL internal address 901, a reference destination VOL # 902, a reference destination VOL internal address 903, a data size 904, and a reference destination VOL type 905. Hereinafter, one block 601 (a "target block 601" in description with reference to FIG. 9) will be taken as an example.

The VOL internal address 901 represents a logical address (for example, a start logical address) of the target block 601. The reference destination VOL # 902 represents a number of the reference destination VOL (an additional-writing volume or a common volume) of the logical address of the target block 601. The reference destination VOL internal address 903 represents a logical address (a logical address inside the reference destination VOL) of the reference destination of the logical address of the target block 601. The data size 904 represents the size of a compressed data set of a data set having the target block 601 as its write destination.

The reference destination VOL type 905 represents a type ("individual (an additional-writing volume) or "common" (a common volume)) of the reference destination VOL of the logical address of the target block 601.

FIG. 10 illustrates the configuration of the valid area management table 424.

The valid area management table 424 is present for each logical volume 501. The valid area management table 424 stores information relating to a valid area. For example, the valid area management table 424 includes an entry for each block. Each entry stores information of a VOL internal address 1001 and a validness flag 1002. Hereinafter, one block 601 (a "target block 601" in description with reference to FIG. 10) will be taken as an example.

The VOL internal address 1001 represents the logical address of the target block 601. The validness flag 1002 represents whether the target block 601 belongs to a valid area ("valid") or not ("invalid").

FIG. 11 illustrates the configuration of the page translation table 425.

The page translation table 425 is present for each logical volume 501 and each additional-writing volume 502. The page translation table 425 stores information relation to a relation between an area of the logical volume 501 (for example, blocks 601 corresponding to the size of a page 51) and the page 51. For example, the page translation table 425 includes an entry for each area of the logical volume 501. Each entry stores information of a VOL internal address 1101, an allocation flag 1102, and a page # 1103. Hereinafter, one area (a "target area" in description with reference to FIG. 11) will be taken as an example.

The VOL internal address 1001 represents the logical address (for example, a start logical address) of the target area. The allocation flag 1102 represents whether a page 51 is allocated to the target area ("allocated") or not ("unallocated"). The page number 1103 represents a number of the page 51 allocated to the target area.

FIG. 12 illustrates the configuration of the page allocation management table 426.

The page allocation management table 426 is present for each pool 503. The page allocation management table 426 stores information of a relation between a page 51 and an allocation destination. For example, the page allocation management table 426 includes an entry for each page 51. Each entry stores information of a page # 1201, an allocation flag 1202, an allocation destination VOL # 1203, and an allocation destination VOL internal address 1204. Hereinafter, one page 51 (a "target page 51" in description with reference to FIG. 12) will be taken as an example.

The page # 1201 represents a number of the target page 51. The allocation flag 1202 represents whether the target page 51 is allocated ("allocated") or not ("unallocated"). The allocation destination VOL # 1203 represents a number of the allocation destination VOL (a logical volume 501 or an additional-writing volume 502) of the target page 51. The allocation destination VOL internal address 1204 represents the logical address (for example, a start logical address) of an area of the target page 51 in the allocation destination VOL.

FIG. 13 illustrates the configuration of the sub-block management table 427.

The sub-block management table 427 is present for each additional-writing volume 502. The sub-block management table 427 stores information relating to a sub-block 602. For example, the sub-block management table 427 includes an entry for each sub-block 602. Each entry stores information of a page # 1301, a page internal address 1302, an allocation flag 1303, a VOL internal address 1304, and a sub-block size 1305. Hereinafter, one sub-block 602 (a "target sub-block 602" in description with reference to FIG. 13) will be taken as an example.

The page # 1301 represents a number of a page 51 including the target sub-block 602. The page internal address 1302 represents the logical address of the target sub-block 602. The allocation flag 1303 represents whether the target sub-block 602 is allocated ("allocated") or not ("unallocated"), in other words, whether the target sub-block 602 is used or unused. The VOL internal address 1304 represents the logical address (the logical address of an area in the additional-writing volume 502) of the allocation destination of the target sub-block 602. The sub-block size 1305 represents the size of the target sub-block 602 (in other words, the size of a compressed data set stored in the target sub-block 602).

FIG. 14 illustrates the configuration of the additional-writing destination search table 428.

The additional-writing destination search table 428 represents an additional-writing destination of a compressed data set. The additional-writing destination search table 428, for example, includes an entry for each additional-writing volume 502. Each entry stores information of a VOL # 1401, an additional-writing destination address 1402, and an end address 1403. Hereinafter, one additional-writing volume 502 (a "target additional-writing volume 502" in description with reference to FIG. 14) will be taken as an example.

The VOL # 1401 represents a number of the target additional-writing volume 502. The additional-writing destination address 1402 represents the logical address of an additional-writing destination in the target additional-writing volume 502 (the logical address of an additional-writing destination in an additional-writing page 51P allocated to the target additional-writing volume 502). The end address 1403 represents the logical address of an end of the logical address that is an additional-writing destination. In a case where a size according to a difference between the logical address of the additional-writing destination and the logical address of the end is less than the compressed data size, the additional-writing cannot be performed, and accordingly, the start logical address of the target additional-writing volume 502 may be set as an additional-writing destination again. More specifically, for example, the storage controller 101 may perform a garbage collection process with a priority from an additional-writing page 51P that is close to the start logical address of the target additional-writing volume 502. In such a case, the allocation of the additional-writing page 51P is released with a priority from the additional-writing page 51P that is close to the start logical address of the target additional-writing volume 502, and, as a result, an area close to the start logical address of the target additional-writing volume 502 is set with a priority as being unused.

FIG. 15 illustrates the configuration of the duplication checking table 489.

The duplication checking table 489 is generated and used in the duplication determining process. The duplication checking table 489 is generated for data that is a target for the duplication determining process and, for example, is stored in the memory 212. "Data" described here, typically, is data of a predetermined process target and is larger than the size of a block. For this reason, although the duplication determining process (and storing of data in the individual area 70 or the common area 80) may be performed in units of blocks (in units of data sets), in this embodiment, the duplication determining process is performed together in units of data that is a processing target instead of units of blocks. More specifically, for example, the data that is a processing target is data according to a write request for one distribution volume 501P, and the size of the data may be integer multiples of the size of the block, and the duplication determining process (and storing of data in the individual area 70 or the common area 80) may be performed in units of data according to the write request (in other words, units of I/O requests). In this way, the duplication determining process (and the storing of data in the individual area 70 or the common area 80) is performed together in units of data that is a processing target and thus is efficient.

The duplication checking table 489, for example, includes an entry for each of one or more blocks 601 corresponding to one or more data sets configuring the data. Each entry stores information of a target VOL # 1501, a target VOL internal address 1502, a hash value 1503, a hit flag 1504, a comparison destination VOL # 1505, a comparison destination VOL internal address 1506, a comparison success flag 1507, a storage destination VOL # 1508, and a storage destination VOL internal address 1509. Hereinafter, one block 601 (a "target block 601" in description with reference to FIG. 15) will be taken as an example.

The target VOL # 1501 represents a number of the logical volume 501 including the target block 601. The target VOL internal address 1502 represents the logical address of the target block 601. The hash value 1503 represents a hash value corresponding to the target block 601 (a hash value of a data set having the target block 601 as its write destination).

The hit flag 1504 represents a hash value hit ("Hit") or not ("Miss"). Here, the "hash value hit" represents that a hash value coinciding with a hash value corresponding to the target block 601 is already present.

The comparison destination VOL # 1505 is valid in a case where a hash value hit occurs for the target block 601 and represents a number of the comparison destination VOL. Here, the "comparison destination VOL" is a logical volume 501 that stores a data set having a hash value coinciding with a hash value corresponding to the target block 601 and is a logical volume 501 that is a comparison destination between data sets. The comparison destination VOL is one of the distribution volume 501P and the common volume 501C. The comparison destination VOL internal address 1506 represents the logical address of a block 601 storing a data set having a hash value coinciding with a hash value corresponding to the target block 601 (the logical address of the block 601 in the comparison destination VOL). For the target block 601, a plurality of sets of a comparison destination VOL # 1505 and a comparison destination VOL internal address 1506 may be present.

The comparison success flag 1507 represents whether a comparison between data sets performed in a case where a hash value hit occurs for the target block 601 is successful ("success") or unsuccessful ("fail"). In a case where the data sets coincide with each other, the comparison success flag 1507 is "success."

The storage destination VOL # 1508 represents a number of the storage destination VOL. Here, the "storage destination VOL" is the logical volume 501 of the storage destination of a data set having the target block 601 as its write destination. In a case where a data set having the target block 601 as its write destination is an individual data set, the storage destination VOL is the additional-writing volume 502. On the other hand, in a case where a data set having the target block 601 as its write destination is a duplicate data set, the storage destination VOL is the common volume 501C. The storage destination VOL internal address 1509 represents the logical address of a storage destination block of a data set having the target block 601 as its write destination (the logical address of the block inside the storage destination VOL).

Figures 16, 17:
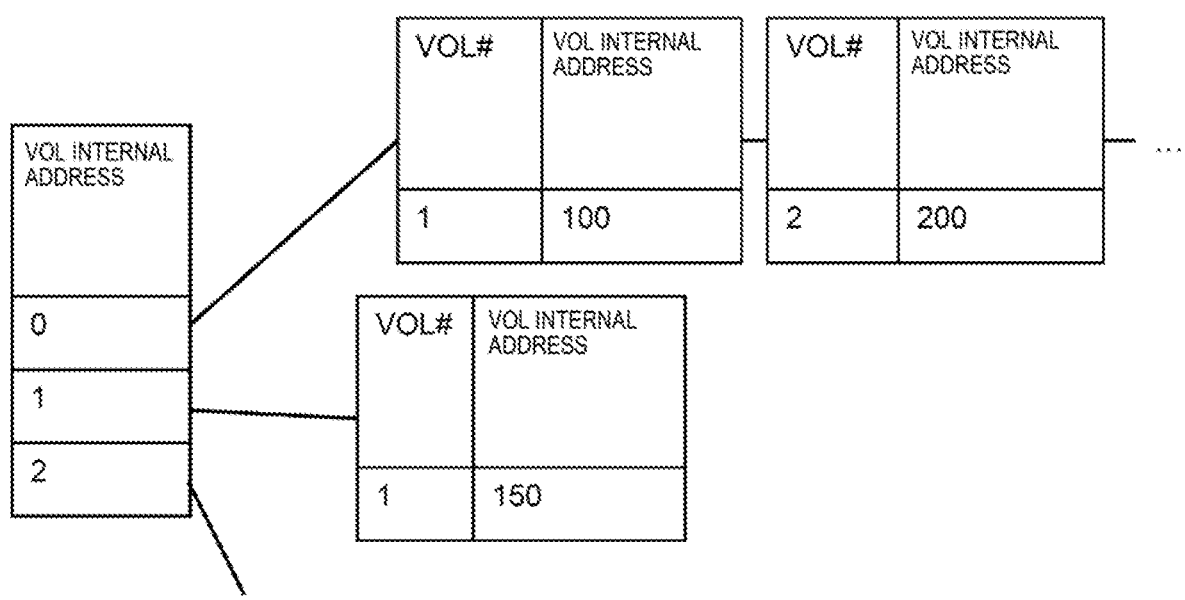
FIG. 16 illustrates a configuration of a hash management table.
FIG. 17 illustrates a configuration of a duplication management table.

FIG. 16 illustrates the configuration of the hash management table 429.

The hash management table 429 stores information relating to a hash value of a data set. The hash management table 429, for example, includes an entry for each hash value. Each entry stores information of a hash value 1601, a registration flag 1602, a VOL #1603, and a VOL internal address 1604. Hereinafter, one hash value (a "target hash value" in description with reference to FIG. 16) will be taken as an example.

The hash value 1601 represents a target hash value. The registration flag 1602 represents whether a data set having the target hash value as its hash value is present ("presence") in the storage system 200 or not ("absence").

The VOL # 1603 represents a number of the logical volume 501 that stores the data set having the target hash value as its hash value. The VOL internal address 1604 represents the logical address of a block 601 that stores the data set having the target hash value as its hash value. In the duplication determining process, in a case where a hash value hit occurs for the target hash value, the VOL # 1603 and the VOL internal address 1604 corresponding to the target hash value are the comparison destination VOL # 1505 and the comparison destination VOL internal address 1506 in the duplication checking table 489 illustrated in FIG. 15.

FIG. 17 illustrates the configuration of the duplication management table 430.

The duplication management table 430 represents a position (logical address) of a duplicate data set. The duplication management table 430, for example, includes a VOL internal address (logical address) for each of a plurality of blocks 601C configuring the common volume 501C. An entry of a reference source is associated with a block 601C of which the reference source is present, for example, in a cue form. The entry of the reference source stores the VOL # (a number of the logical volume 501 including the block 601 that is a reference source) and the VOL internal address (the logical address of the block 601 that is a reference source).

FIG. 18 illustrates the configuration of the common area allocation management table 431.

The common area allocation management table 431 is present for each common volume 501C. The common area allocation management table 431 represents the empty status of the common volume 501C.

The common area allocation management table 431, for example, includes an entry for each of a plurality of blocks 601C configuring the common volume 501C. Each entry stores information of a VOL internal address 1801 and a use flag 1802. Hereinafter, one block 601C (a "target block 601C" in description with reference to FIG. 18) will be taken as an example.

The VOL internal address 1801 represents the logical address of the target block 601C. The use flag 1802 represents whether the target block 601C is in use ("in-use") or not ("not-in-use"). The use flag 1802 "in-use" represents that a page 51 has been allocated to the target block 601C directly (not through the additional-writing volume) or indirectly (through the additional-writing volume). The use flag 1802 "not-in-use" represents that the page 51 has not been allocated to the target block 601C, in other words, the target block 601C is empty.

FIG. 19 illustrates the configuration of the common area checking table 432.

The common area checking table 432 is present for each common volume 501C. The common area checking table 432 represents a reference status for the common volume 501C. For example, the common area checking table 432 includes an entry for each of a plurality of blocks 601C configuring the common volume 501C. Each entry stores information of a VOL internal address 1901 and a reference flag 1902. Hereinafter, one block 601C (a "target block 601C" in description with reference to FIG. 19) will be taken as an example.

The VOL internal address 1901 represents the logical address of the target block 601C. The reference flag 1902 represents whether one or more reference source blocks 601 are present ("presence") or not ("absence") for the target block 601C.

Here, several processes executed in this embodiment will be described. In the following description, compression and decompression of a data set may be executed using the data amount reduction program 414 (or by calling the data amount reduction program 414).

Figure 20:
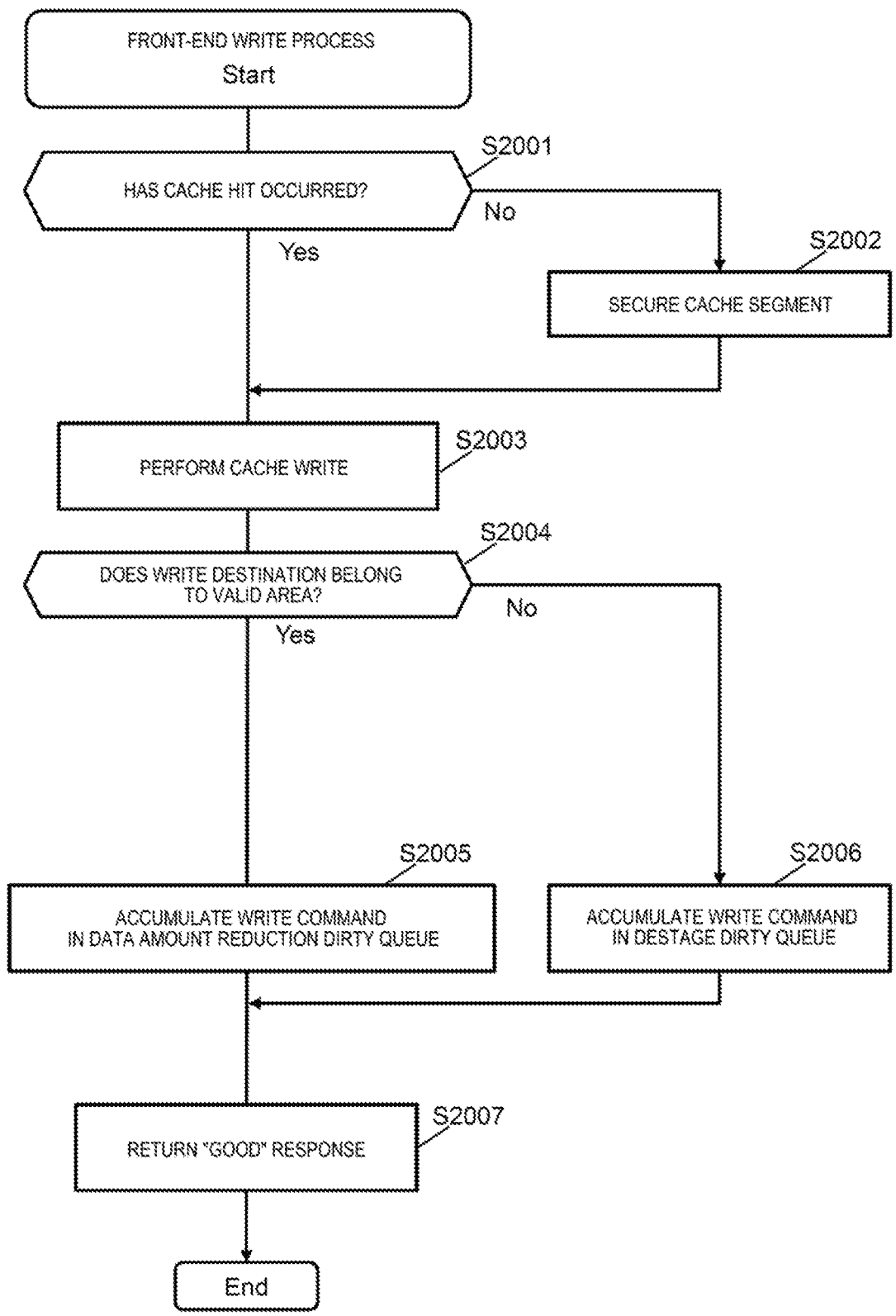
FIG. 20 illustrates the flow of a front-end write process.

FIG. 20 illustrates the flow of a front-end write process. The front-end write process is executed when a write request for the logical volume 501 is received.

The front-end write program 412 determines whether or not a cache hit has occurred (S2001). A "cache hit" for a write request represents that a cache segment corresponding to a write destination according to the write request (an area in the cache memory 402) is secured.

In a case where a result of the determination of S2001 is "No" (S2001: No), the front-end write program 412 secures the cache segment from the cache memory 402 (S2002).

On the other hand, in a case where a result of the determination of S2001 is "Yes" (S2001: Yes) or after S2002, the front-end write program 412 writes write target data according to the write request into the secured cached segment (S2003).

The front-end write program 412 determines whether or not the write destination belongs to a valid area on the basis of the valid area management table 424 corresponding to the logical volume 501 of the write destination (S2004).

In a case where a result of the determination of S2004 is "Yes" (S2004: Yes), the front-end write program 412 accumulates a write command for each or one or more data sets configuring the write target data in a data amount reduction dirty queue (S2005). Here, the "data amount reduction dirty queue" is a queue in which a write command for a data set, of which compression is necessary, that is a dirty data set (a data set that has not been stored in the page 51) is accumulated.

In a case where a result of the determination of S2004 is "No" (S2004: No), the front-end write program 412 accumulates a write command for each of one or more data sets configuring the write target data in a destage dirty queue (S2006). Here, the "destage dirty queue" is a queue in which a write command for a data set, of which compression is not necessary, that is a dirty data set (a data set that has not been stored in the page 51) is accumulated.

After S2005 or S2006, the front-end write program 412 returns a Good response (write completion report) to the transmission source of the write request (S2007).

In addition, the Good response to the write request may be returned in a case where a back-end write process is completed. In other words, the back-end write process may be performed synchronously or asynchronously with the front-end process. The back-end write process is executed by the back-end write program 413. More specifically, for example, the back-end write program 413, for a write command disposed in the destage dirty queue, writes an uncompressed or compressed data set in a page 51 allocated to the write destination.

Figure 21:
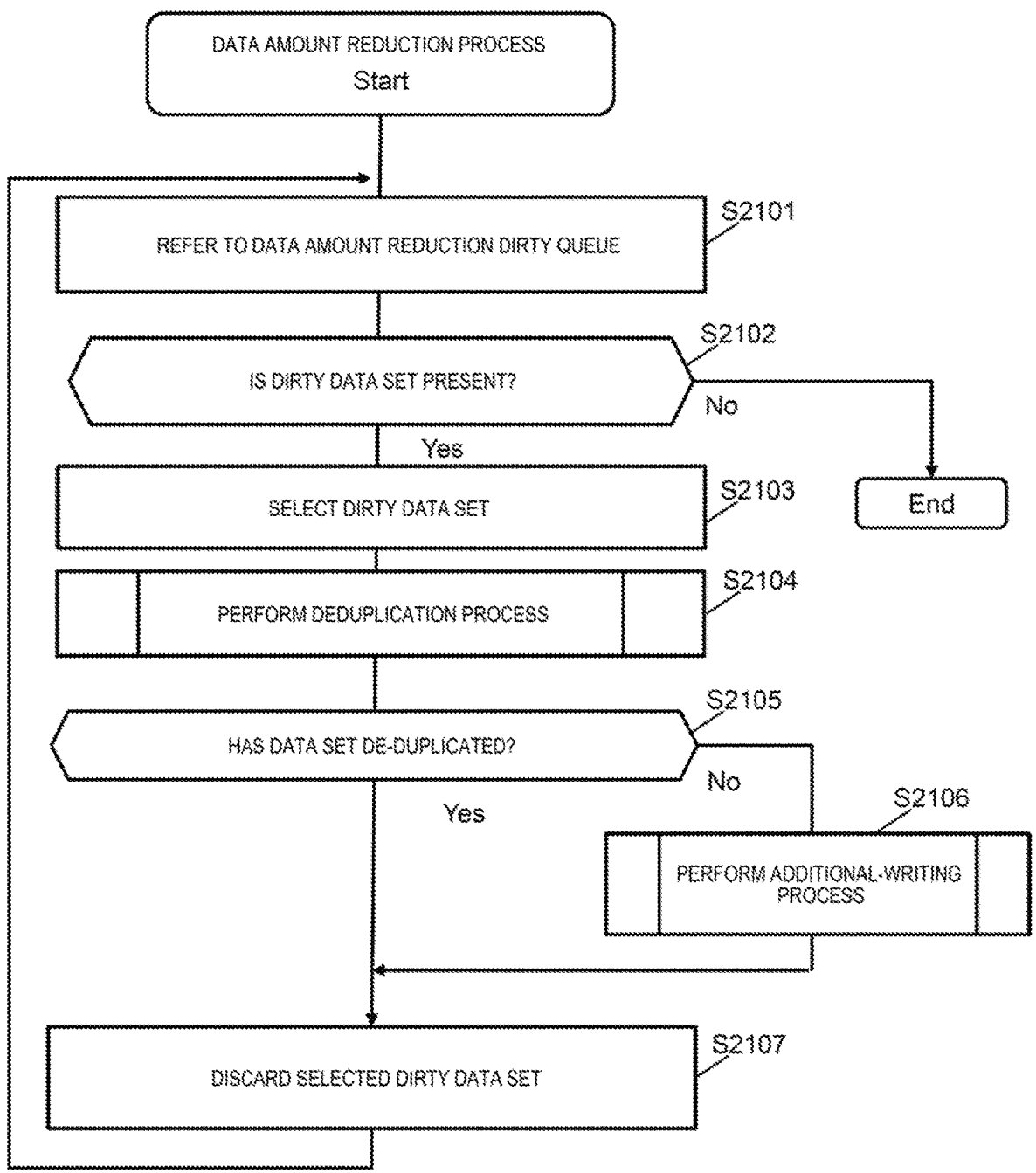
FIG. 21 illustrates the flow of a data amount reduction process.

FIG. 21 illustrates the flow of the data amount reduction process. The data amount reduction process, for example, is performed regularly.

The data amount reduction program 414 refers to a data amount reduction dirty queue (S2101). In a case where there is no command in the queue (S2102: No), the data amount reduction process ends.

On the other hand, in a case where there is a command in the queue (S2102: Yes), the data amount reduction program 414 acquires a write command from the data amount reduction dirty queue, in other words, selects a dirty data set (S2103).

The data amount reduction program 414 performs the deduplication process for the data set selected in S2103 (S2104). In a case where the selected data set is an individual data set, and thus is not de-duplicated (S2105: No), the data amount reduction program 414 performs an additional-write process for the individual data set (S2106).

In a case where the data set selected in S2103 is a duplicate data set and thus is de-duplicated (S2105: Yes) or after S2106, the data amount reduction program 414 discards (for example, deletes from the cache memory 402) the selected data set (S2107).

Figure 22:
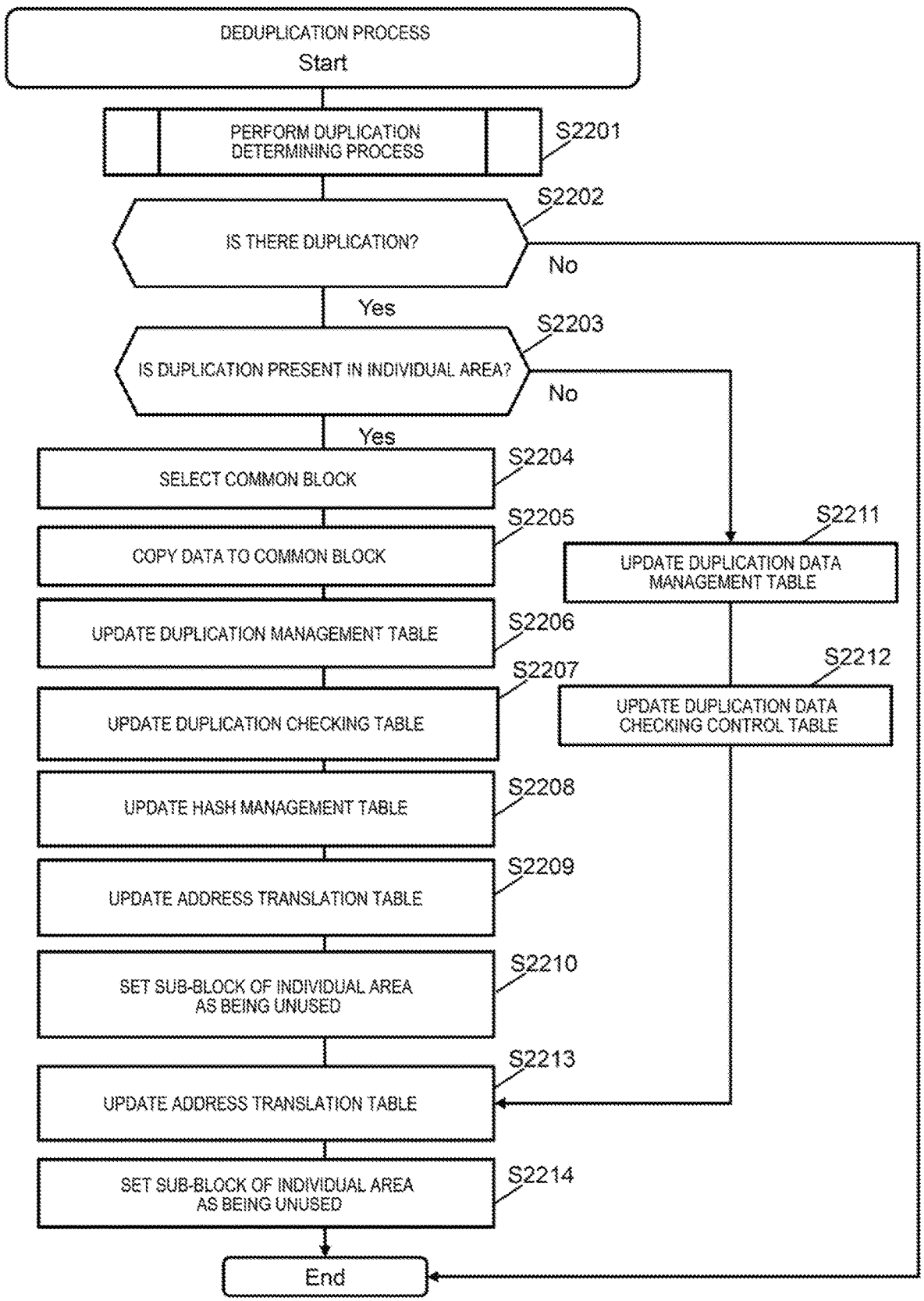
FIG. 22 illustrates the flow of a deduplication process.

FIG. 22 illustrates the flow of the deduplication process. The deduplication process is performed for the data set selected in S2103 illustrated in FIG. 21. Hereinafter, in description with reference to FIGS. 22 and 23, the selected data set will be referred to as a "write data set," a write destination block of the target data set will be referred to as a "write destination block," and a logical volume including the write destination block will be referred to as a "write destination volume."

The data amount reduction program 414 performs the duplication determining process for the write data set (S2201). As a result of S2201, in a case where the write data set is an individual data set (S2202: No), the deduplication process ends.

On the other hand, as a result of S2201, in a case where the write data set is a duplicate data set (S2202: Yes), the data amount reduction program 414 determines whether or not another duplicate data set having duplication with the write data set is present in the individual area 70 (S2203).

Here, the write data set and another duplicate data set having duplication with the write data set will be collectively referred to as "duplicate data sets" in the following description with reference to FIG. 22. In other words, in the following description with reference to FIG. 22, a "duplicate data set" is any one of two or more data sets including the write data set. In a case where a duplicate data set is a data set that is present in the individual area 70, in one of S2204 and S2205 to be described later, a compressed data set of the data set is temporarily decompressed by the data amount reduction program 414, and the decompressed data set may be set as the duplicate data set.

In addition, the determination of S2203, for example, is on the basis of whether a comparison destination VOL # 1505 corresponding to the write destination block coincides with the VOL #801 of the VOL attribute 802 "distribution" or the VOL # 801 of the VOL attribute 802 "common." In a case where the comparison destination VOL # 1505 corresponding to the write destination block coincides with the VOL # 801 of the VOL attribute 802 "distribution," another duplicate data set is present in the individual area 70, and accordingly, a result of the determination of S2203 is "Yes." On the other hand, in a case where the comparison destination VOL #1505 corresponding to the write destination block coincides with the VOL # 801 of the VOL attribute 802 "common," another duplicate data set is present in the common area 80, and a result of the determination of S2203 is "No."

In a case where a result of the determination of S2203 is "Yes" (S2203: Yes), the next process is performed. In other words, the data amount reduction program 414 selects a common block 601C of which the use flag 1802 is "unused" (S2204). Hereinafter, in this paragraph, the selected common block 601C will be referred to as a "target common block 601C," and a common volume 501C including the target common block 601C will be referred to as a "target common volume 501C." The data amount reduction program 414 compresses a duplicate data set and adds the compressed data set to the additional-writing common page 51C (a page 51C associated with the additional-writing volume 502 corresponding to the target common volume 501C) (S2205). The data amount reduction program 414 updates the duplication management table 430, more specifically, associates all the blocks 601P corresponding to all the duplicate data sets with the target common block 601C as reference sources (S2206). The data amount reduction program 414 updates the duplication checking table 489, more specifically, registers the number of the target common volume 501C and the logical address of the target common block 601C as a storage destination VOL # 1508 corresponding to the write destination block and the storage destination VOL internal address 1509 (S2207). The data amount reduction program 414 updates the hash management table 429, for example, registers the hash value 1601 (the hash value of the duplicate data set), the registration flag 1602 ("presence"), the VOL # 1603 (the number of the target common volume 501C), and the VOL internal address 1604 (the logical address of the target common block 601C) (S2208). The data amount reduction program 414 updates the address translation table 422 corresponding to the distribution volume 501P storing a duplicate data set other than the write data set, more specifically, changes the reference destination VOL # 902 corresponding to the duplicate data set and the reference destination VOL internal address 903 to the number of the target common volume 501C and the logical address of the target common block 601C and changes the reference destination VOL type 905 corresponding to the duplicate data set to "common" (S2209). The data amount reduction program 414 updates the sub-block management table 427 relating to the additional-writing volume 502 corresponding to the distribution volume 501P storing the duplicate data set other than the write data set, more specifically, changes the allocation flag 1303 corresponding to a sub-block storing compressed data set of the duplicate data set other than the write data set to "unallocated" (S2210).

In a case where a result of the determination of S2203 is "No" (S2203: No), the next process is performed. In other words, the data amount reduction program 414 updates the duplication management table 430, more specifically, newly associates the write destination block 601P with the common block 601C in which the duplicate data set is stored as a new reference source (S2211). The data amount reduction program 414 updates the duplication checking table 489, more specifically, registers the logical address of the common block 601C storing the duplicate data set and the number of the common volume 501C including the common block 601C as the storage destination VOL internal address 1509 corresponding to the write destination block and the storage destination VOL # 1508 (S2212).

After S2210 or S2212, the data amount reduction program 414 updates the address translation table 422 corresponding to the write destination volume 501P, more specifically, changes the reference destination VOL # 902 and the reference destination VOL internal address 903 corresponding to the write destination block (write data set) to the number of the common volume 501C and the logical address of the common block 601C and changes the reference destination VOL type 905 corresponding to the write destination block to "common" (S2213). In a case where compressed data set of the write data set is present in the additional-writing individual page 51P, the data amount reduction program 414 updates the sub-block management table 427 relating to the additional-writing volume 502 corresponding to the write destination volume 501P, more specifically, changes the allocation flag 1303 corresponding to the sub-block storing the compressed data set of the write data set to "unallocated" (S2214).

In this embodiment, although the deduplication process is a process as the post-process described above, in the case of a process as the in-process, for example, S2214 of FIG. 22 may not be performed. The reason for this is that deduplication is achieved without additionally writing the compressed data set of the write data set (or without compressing the write data set).

Figure 23:
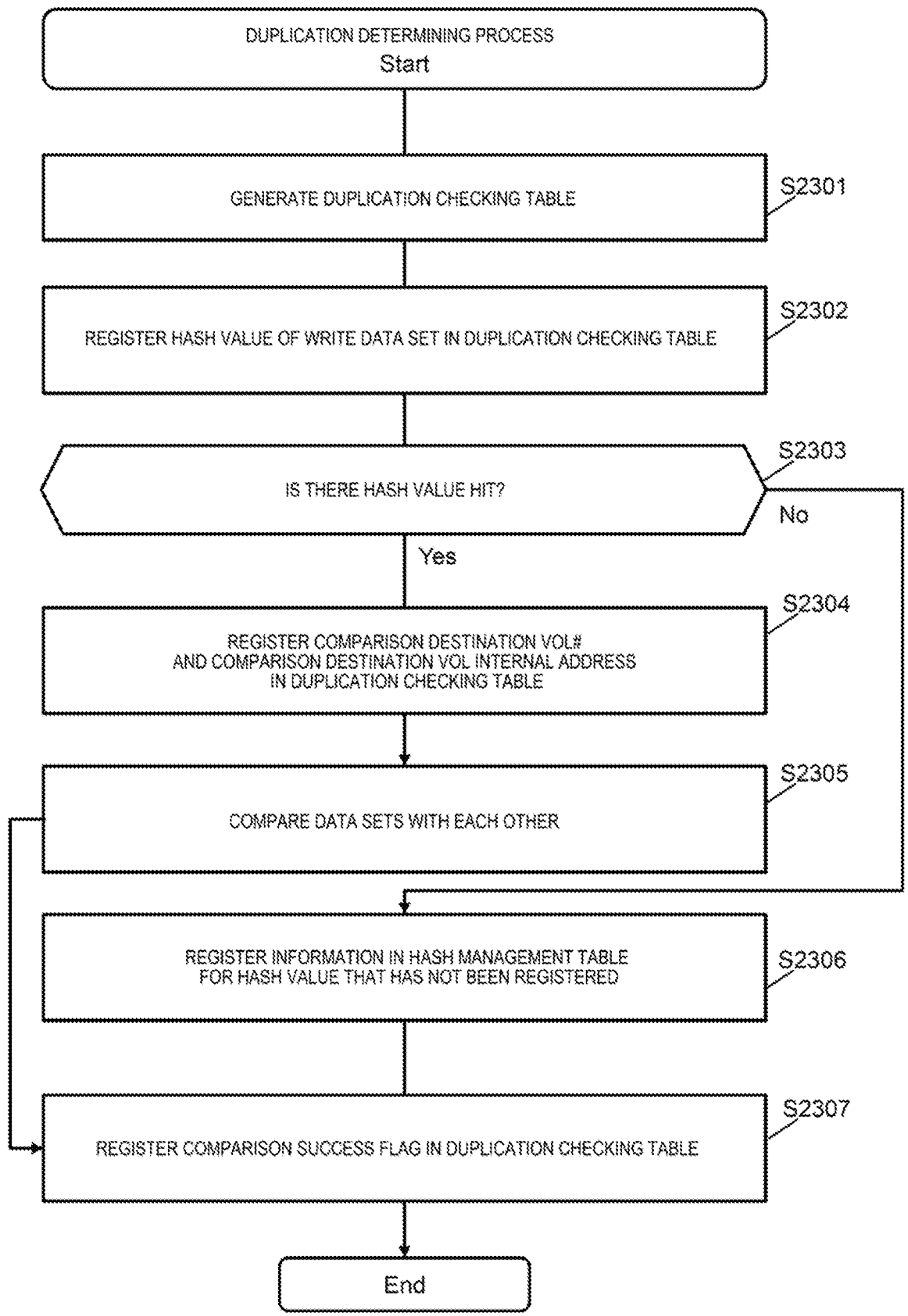
FIG. 23 illustrates the flow of a duplication determining process.

FIG. 23 illustrates the flow of the duplication determining process.

The data amount reduction program 414 generates the duplication checking table 489 relating to a write data set (S2301). In a case where the deduplication process is performed in units of data that is a predetermined processing target, for example, I/O units, and, as a result, data includes a plurality of data sets, the duplication checking table 489 includes a plurality of entities corresponding to the plurality of data sets.

The data amount reduction program 414 registers a hash value of the write data set as the hash value 1503 corresponding to the write destination block (S2302).

The data amount reduction program 414 determines whether or not a hash value coinciding with the hash value registered in S2302 is registered in the hash management table 429, in other words, whether or not a hash value hit occurs (S2303).

In a case where a result of the determination of S2303 is "Yes" (S2303: Yes), the data amount reduction program 414 updates the duplication checking table 489, more specifically, registers the VOL # 1603 and the VOL internal address 1604 corresponding to the hash value coinciding with the hash value registered in S2302 as the comparison destination VOL # 1505 and the comparison destination VOL internal address 1506 corresponding to the write destination block 601P (S2304). The data amount reduction program 414 compares the write data set with a data set (for example, a decompressed data set) acquired on the basis of the comparison destination VOL # 1505 and the comparison destination VOL internal address 1506 (S2305). The comparison of S2305 may be a comparison between compressed data sets.

In a case where a result of the determination of S2303 is "No" (S2303: No), the data amount reduction program 414 updates the hash management table 429, more specifically, registers the hash value 1601 (the hash value of the write data), the registration flag 1602 "presence," the VOL # 1603 (the number of the write destination volume 501P), and the VOL internal address 1604 (the logical address of the write destination block 601P) in a new entry (S2306).

After S2305 or S2306, the data amount reduction program 414 updates the duplication checking table 489, more specifically, registers a comparison success flag 1507 corresponding to the write destination block 601P (S2307). More specifically, in a case where coincidence is acquired in S2305, the comparison success flag 1507 is "success." On the other hand, in a case where incidence is not acquired in S2305 or in a case where S2306 is performed, the comparison success flag 1507 is "fail."

Figure 24:
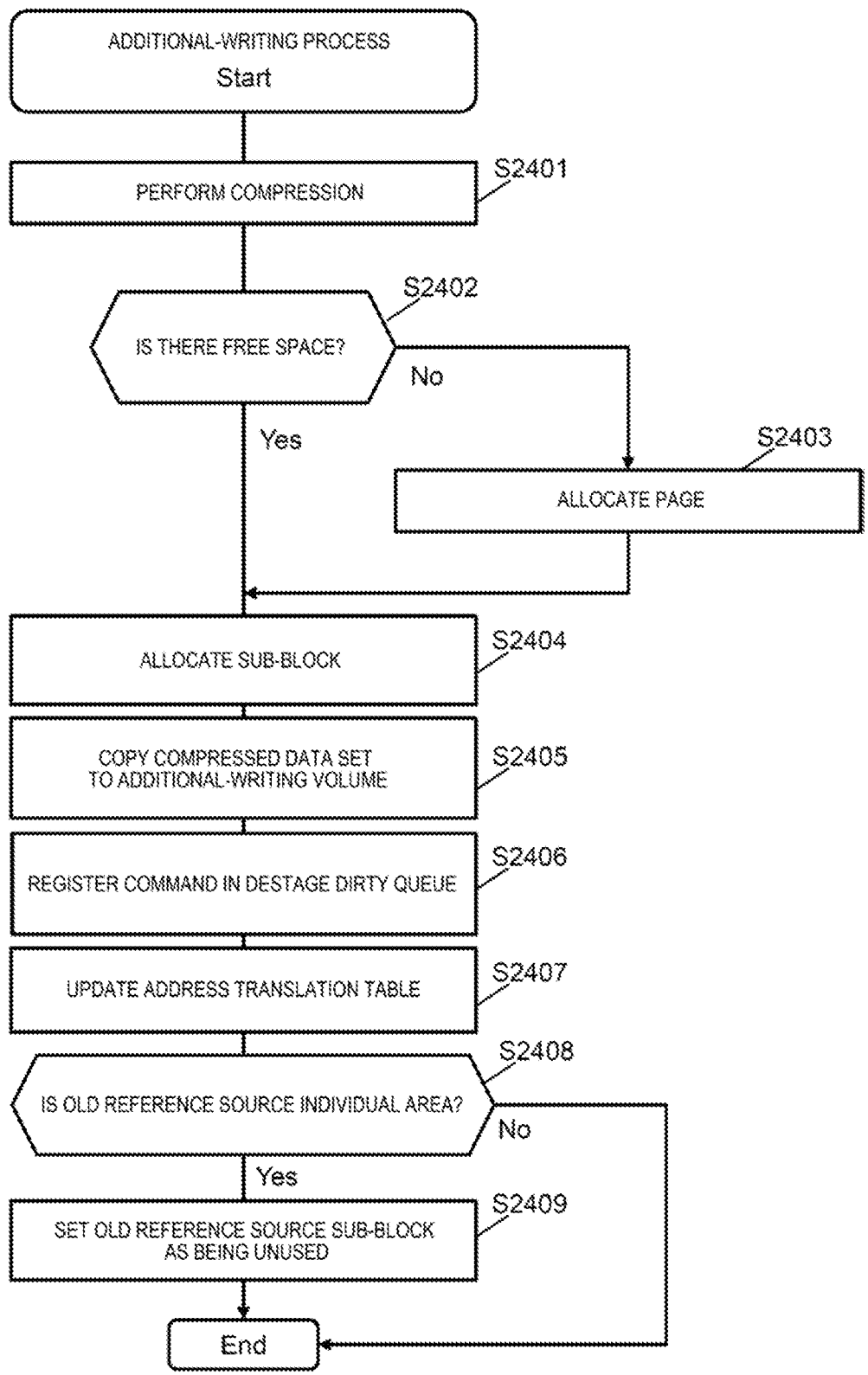
FIG. 24 illustrates the flow of an additional-write process.

FIG. 24 illustrates the flow of the additional-writing process. The additional-writing process is performed for the data set selected in S2103 of FIG. 21. Hereinafter, in description with reference to FIG. 24, the selected data set will be referred to as a "write data set," a write destination block of the target data set will be referred to as a "write destination block," and a logical volume including the write destination block will be referred to as a "write destination volume."

The data amount reduction program 414 compresses the write data set and stores the compressed data set, for example, in the cache memory 402 (S2401). The data amount reduction program 414 determines whether or not there is a free space of the size of the compressed data set or more in the page 51P allocated to the additional-writing volume 502 corresponding to the write destination volume 501P (S2402). Such determination, for example, can be made by referring to the sub-block management table 427 corresponding to the additional-writing volume 502 using the number of the page 51P allocated to an area to which the additional-writing destination address 1402 corresponding to the additional-writing volume 502 belongs as a key.

In a case where a result of the determination of S2402 is "No" (S2402: No), the data amount reduction program 414 allocates the unallocated page 51 to the additional-writing volume 502 corresponding to the write destination volume 501P (S2403).

On the other hand, in a case where a result of the determination of S2402 is "Yes" (S2402: Yes) or after S2403, the data amount reduction program 414 allocates a sub-block set as an additional-writing destination (S2404). The data amount reduction program 414 copies the compressed data set of the write data set to the additional-writing volume 502, for example, copies the compressed data set to an area (an area of the cache memory 402) for the additional-writing volume 502 (S2405). The data amount reduction program 414 registers a write command for the compressed data set in the destage dirty queue (S2406). The data amount reduction program 414 updates the address translation table 422 corresponding to the write destination volume 501P, more specifically, changes the reference destination VOL # 902 and the reference destination VOL internal address 903 corresponding to the write destination block to the number of the additional-writing volume 502 and the logical address of the sub-block allocated in S2404 and changes the reference destination VOL type 905 corresponding to the write destination block to "individual" (S2407).

The data amount reduction program 414 determines whether or not a reference source of the old sub-block (old reference source) is the logical address of the write destination block 601P (in other words, the individual area 70 or not) (S2408). Here, the "old sub-block" is a sub-block that stores the compressed data set before update of the compressed data set of the write data set. In other words, the determination of S2408 is determination of whether the write data set is a data set after the update of the data set inside the individual area 70 or a data set after update of the data set inside the common area 80.

In a case where a result of the determination of S2408 is "Yes" (S2408: Yes), the data amount reduction program 414 updates the allocation flag 1303 corresponding to the old sub-block as being "unallocated" (S2409).

Figure 25:
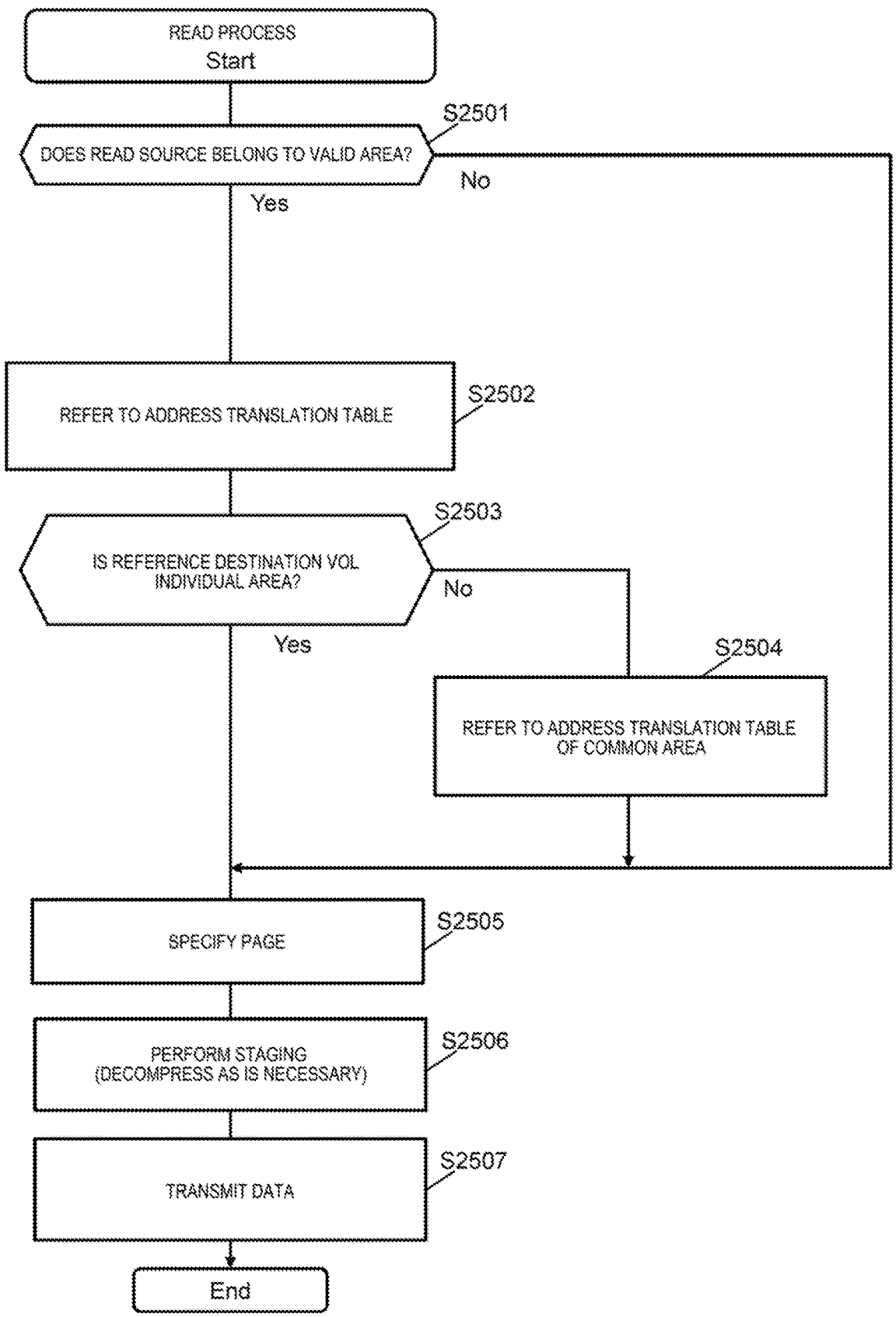
FIG. 25 illustrates the flow of a read process.

FIG. 25 illustrates the flow of a read process. The read process is performed when a read request for the logical volume 501 is received.

The read program 411 determines whether or not a read source according to the read request belongs to a valid area on the basis of the valid area management table 424 (S2501).

In a case where a result of the determination of S2501 is "Yes" (S2501: Yes), the read program 411 refers to the address translation table 422 corresponding to the distribution volume 501P of the read source (S2502). The read program 411 performs a process described below for each block configuring the area of the read source.

The read program 411 determines whether or not the reference destination VOL type 905 corresponding to the block is "individual" (S2503).

In a case where a result of the determination of S2503 is "No" (S2503: No), the read program 411 refers to the address translation table 422 corresponding to the common volume 501C on the basis of the reference destination VOL

902 and the reference destination VOL internal address 903 corresponding to the block (S2504).

In a case where a result of the determination of S2503 is "Yes" (S2503: Yes) or after S2504, the read program 411 specifies a page 51 corresponding to the block on the basis of the page translation table 425 (S2505). The read program 411 reads a compressed data set corresponding to the block from the specified page 51, decompresses the compressed data set, and stores the decompressed data set in the cache memory 402 (S2506).

In a case where a result of the determination of S2501 is "Yes" (S2501: Yes), when the process of S2503 to S2506 ends for each block configuring the area of the read source, the data according to the read request is stored in the cache memory 402, and accordingly, the read program 411 transmits the data to the transmission source of the read request (S2507).

In a case where a result of the determination of S2501 is "No" (S2501: No), the read program 411 specifies the page 51 allocated to the area of the read source on the basis of the page translation table 425 (S2505). The read program 411 reads the data that is a read target from the specified page 51 (S2506) and transmits the read data to the transmission source of the read request (S2507).

Figure 26:
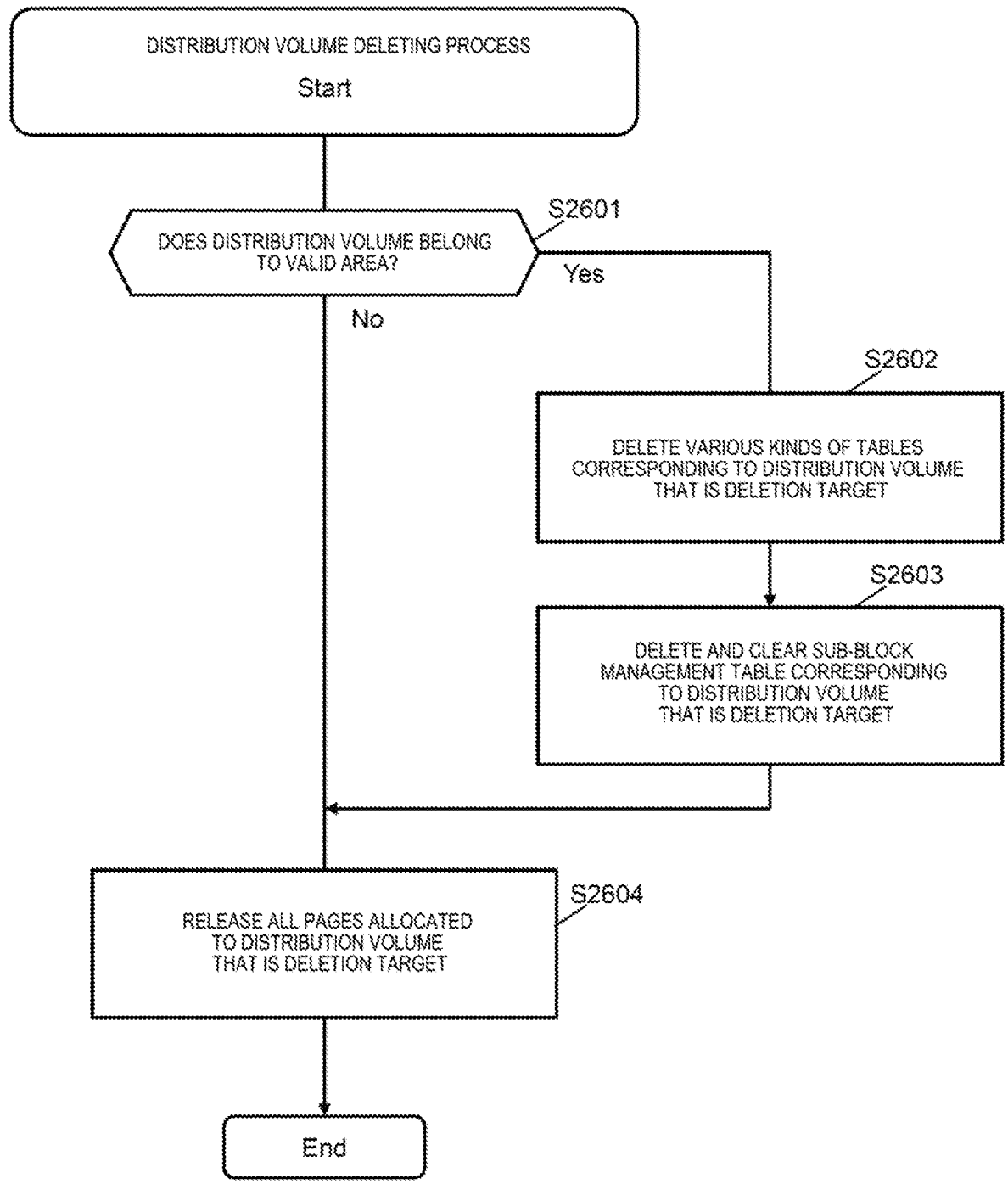
FIG. 26 illustrates the flow of a distribution volume deleting process.

FIG. 26 illustrates the flow of a distribution volume deleting process. The distribution volume deleting process, for example, is performed when a volume deletion request designating one distribution volume 501P is received.

The VOL management program 415 determines whether or not the distribution volume 501P that is a deletion target belongs to a valid area on the basis of the valid area management table 424 (S2601).

For an area for which a result of the determination of S2601 is "Yes (S2601: Yes), the VOL management program 415 deletes various tables (more specifically, the tables 422, 424, and 425) corresponding to the distribution volume 501P that is the deletion target (S2602). In addition, the VOL management program 415 also deletes the sub-block management table 427 corresponding to the distribution volume 501P that is the deletion target (S2603).

For an area for which a result of the determination of S2601 is "No" (S2601: No), after S2603, the VOL management program 415 releases all the pages 51 allocated to the distribution volume 501P that is the deletion target as being unallocated (S2604). "All the pages 51" described in this paragraph are all the pages 51 that are directly allocated to the distribution volume 501P that is the deletion target and all the pages 51 (all the pages 51 allocated to the additional-writing volume 502 corresponding to the distribution volume 501P that is the deletion target) that are indirectly allocated to the distribution volume 501P that is the deletion target.

As above, in a case where the distribution volume is set as a deletion target, all the pages that are directly or indirectly allocated to the distribution volume can be released without checking whether or not each of all the pages is referred to from another area and without checking whether or not any one area of the distribution volume refers to the common area 80.

Figure 27:
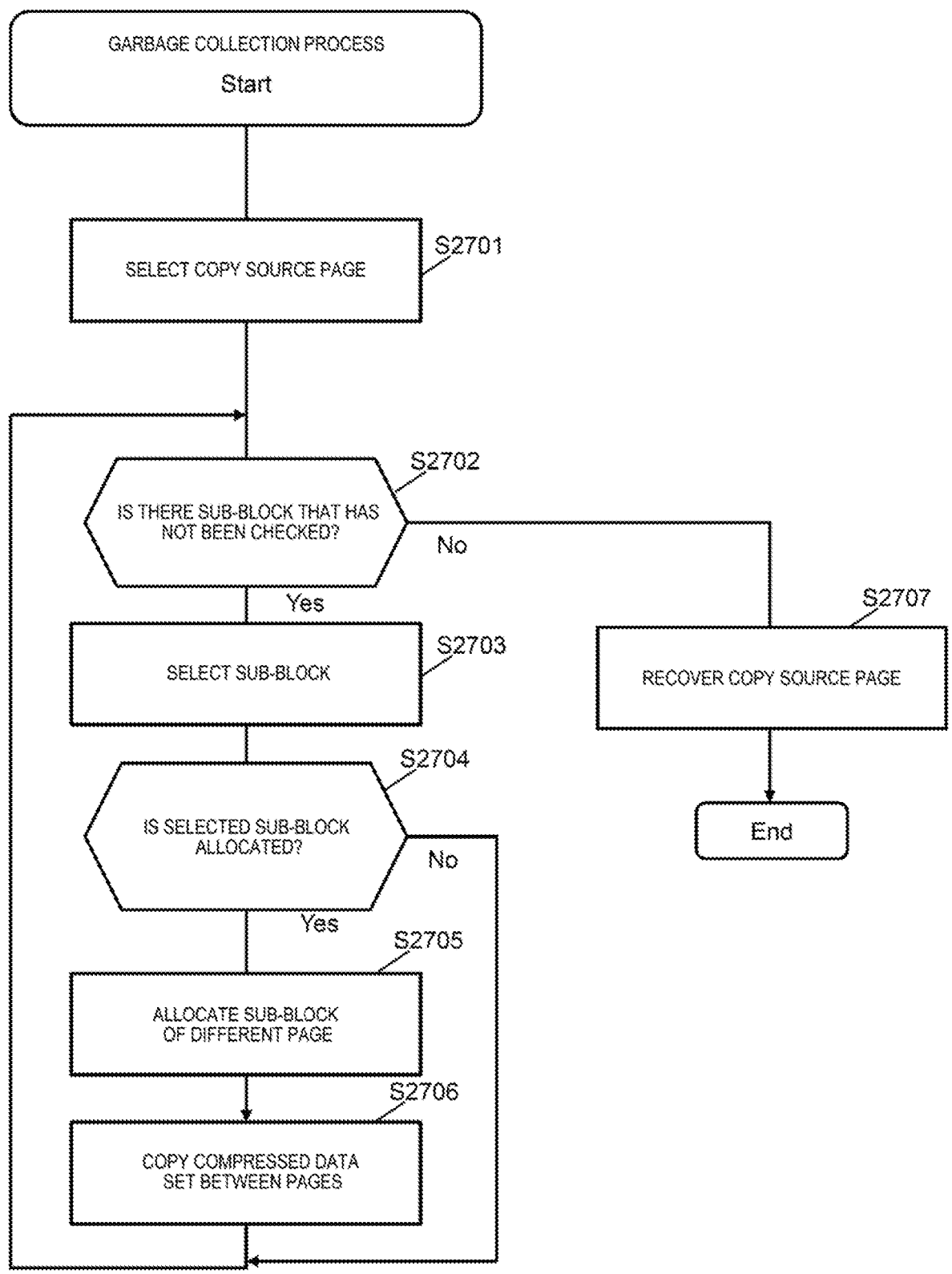
FIG. 27 illustrates the flow of a garbage collection process.

FIG. 27 illustrates the flow of a garbage collection process. The garbage collection process illustrated in the drawing is a process of recovering additional-writing pages. The process, for example, may be regularly started or may be started in a case where it is detected that a ratio of a total volume of unallocated pages 51 to the capacity of the pool 503 is a predetermined value or less by the pool capacity management program 416, or the like.

The pool capacity management program 416 selects a page that is a copy source in the garbage collection process (S2701).

The pool capacity management program 416 determines whether or not there is a sub-block that has not been checked in the garbage collection process for the copy source page selected in S2701 by referring to the sub-block management table 427 corresponding to the additional-writing volume 502 to which the copy source page is allocated (S2702).

In a case where a result of the determination of S2702 is "Yes" (S2702: Yes), the next process is performed. In other words, the pool capacity management program 416 selects one sub-block from among sub-blocks that have not been checked (S2703). In a case where the allocation flag 1303 of the selected sub-block is "allocated" (S2704: Yes), the pool capacity management program 416 allocates a sub-block of a page that is a copy destination (S2705), copies a data set after compression from the sub-block selected in S2703 to the sub-block allocated in S2705 (S2706). In S2706, the reference source of the sub-block of the copy source uses the sub-block of the copy destination instead of the sub-block of the copy source as a reference destination. After S2706, the process is returned to S2702.

In a case where a result of the determination of S2702 is "No" (S2702: No), in other words, in a case where all the valid compressed data sets within the copy source page have been copied to the copy destination page, the pool capacity management program 416 recovers the copy source page, in other words, changes the allocation flag 1202 of the copy source page to "unallocated" (S2707).

As above, in the garbage collection process of an additional-writing page, although the reference destination is updated in S2706, in a case where the additional-writing page is an individual page, a data set to be copied is a compressed data set of an individual data set all the time. Thus, there is one reference source of a copy source sub-block all the time. For this reason, for each copy source sub-block, the update of the reference destination may be performed only for one reference source. Accordingly, the garbage collection process of an additional-writing individual page is efficiently performed.

Figure 28:
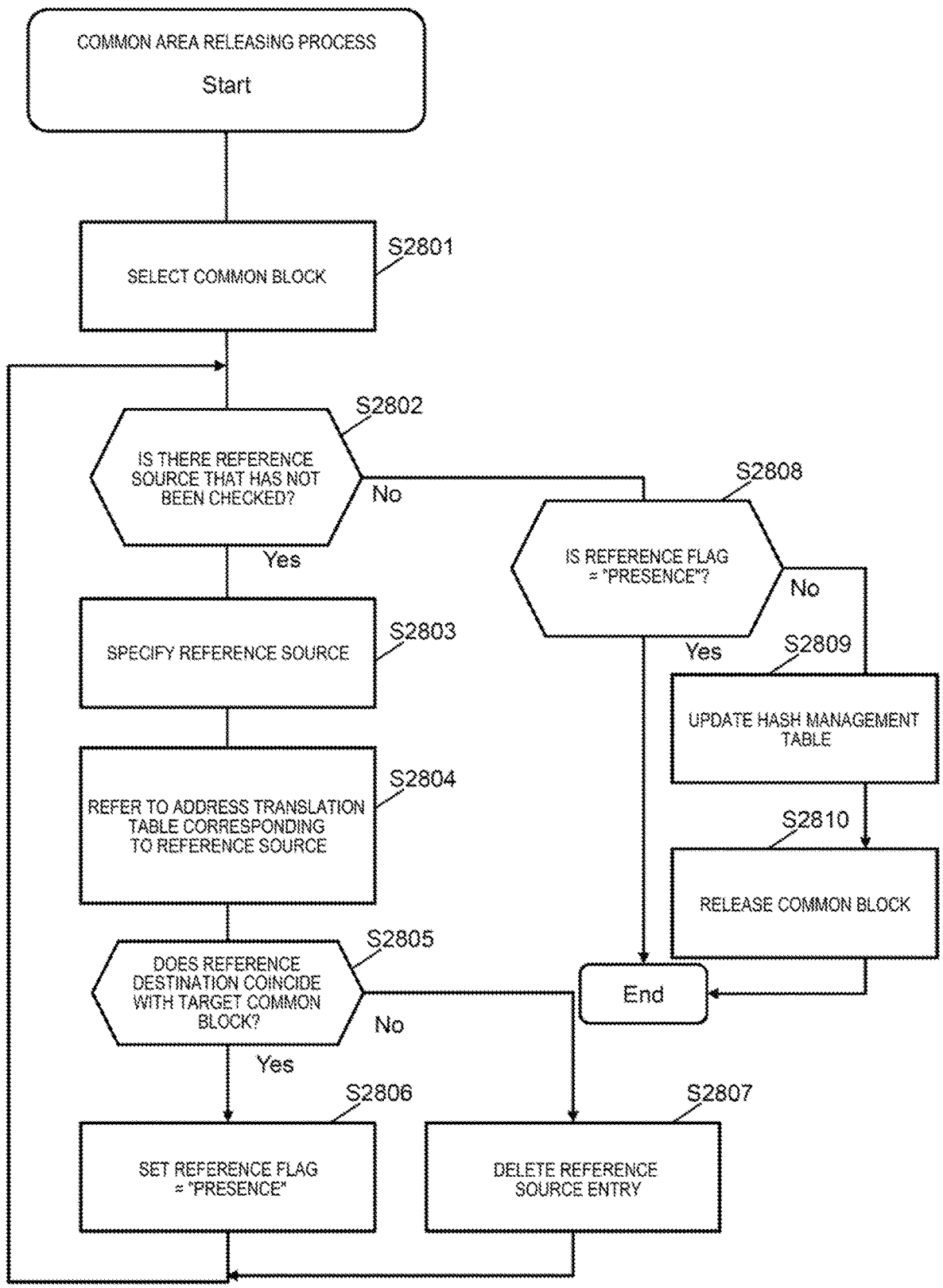
FIG. 28 illustrates the flow of a common area releasing process.

FIG. 28 illustrates the flow of a common area releasing process. The common area releasing process, for example, is regularly performed. In the common area releasing process, the common area checking table 432 corresponding to the common volume 501C that is a processing target may be generated by the common area releasing program 417 or may be prepared in the shared memory 404 in advance.

The common area releasing program 417 selects one common block 601C (S2801). The common block 601C selected in S2801 will be referred to as a "target common block 601C" in description with reference to FIG. 28.

The common area releasing program 417 determines whether or not there is at least one reference source referring to the target common block 601C by referring to the duplication management table 430 (S2802).

In a case where a result of the determination of S2802 is "Yes" (S2802: Yes), the next process is performed. In other words, the common area releasing program 417 selects one reference source entry corresponding to the target common block 601C from the duplication management table 430 and specifies the VOL # and the logical address of the reference source from the reference source entry (S2803). The common area releasing program 417 specifies a reference destination VOL # 902 and a reference destination VOL internal address 903 corresponding to the logical address specified in S2803 from the address translation table 422 corresponding to the VOL #specified in S2803 (S2804). In a case where the reference destination (the reference destination VOL # 902 and the reference destination VOL internal address 903) specified in S2804 coincides with the target common block 601C (S2805: Yes), the common area releasing program 417 sets the reference flag 1902 corresponding to the target common block 601C as being "valid" (S2806). On the other hand, in a case where the reference destination specified in S2804 does not coincide with the target common block 601C (S2805: Yes), the common area releasing program 417 deletes the reference source entry selected in S2803 from the reference source entries corresponding to the target common block 601C (S2807). In addition, in a case where there are a plurality of reference source entries having the same distribution volume 501P as their reference sources in the target common block 601C, the process of S2803 to S2807 may be performed together for a plurality of logical addresses represented by the plurality of reference source entries corresponding to the same distribution volume 501P.

In a case where a result of the determination of S2802 is "No" (S2802: No), the process of S2803 to S2807 has been performed for all the reference source entries corresponding to the target common block 601C, or there is no reference source entry in the target common block 601C. In such a case, the common area releasing program 417 determines whether or not the reference flag 1902 corresponding to the target common block 601C is "valid" (S2808).

In a case where a result of the determination of S2808 is "No" (S2808: No), in other words, in a case where the reference flag 1902 corresponding to the target common block 601C is "invalid," there is no reference source having the target common block 601C as its reference destination, and thus, the next process is performed. In other words, the common area releasing program 417 updates the hash management table 429, more specifically, updates the registration flag 1602 as being "invalid" and deletes the VOL # 1603 and the VOL internal address 1604 for an entry storing the VOL # 1603 and the VOL internal address 1604 corresponding to the target common block 601C (S2809). In addition, the common area releasing program 417 releases the target common block 601C as being unused, more specifically, updates the use flag 1802 corresponding to the target common block 601C as being "unused" (S2810).

In a case where a result of the determination of S2808 is "Yes" (S2808: Yes), the process of S2809 and S2810 is not performed. The reason for this is that there is at least one reference source having the target common block 601C as its reference destination.

According to the common area releasing process described above, the common block 601C for which there is no reference source can be detected, and the detected common block 601C can be released as being unused. Thus, a free space (empty blocks) of the common volume 501C can be increased.

As above, while one embodiment has been described, the embodiment is an example for description of the present invention and is not for the purpose of limiting the scope of the invention only to this embodiment. The invention can be performed in various forms. For example, in the embodiment described above, although a source of I/O requests such as write requests (I/O source) is the server system 201, the source may be a program, which is not illustrated in the drawing, stored in the storage system 200 (for example, an application program executed on a VM).

What is claimed is:

1. A computer system comprising:
a processor unit; and
a memory,
the computer system being connected to a computer issuing a data input/output request and a storage device storing data, wherein
the processor unit generates logical storage areas of a plurality of layers in which storage areas of mutual layers are associated with each other,
the logical storage areas of the plurality of layers include a logical storage area of a first layer of the storage device side and a logical storage area of a second layer of the computer side,
the logical storage area of the first layer includes a common area and an individual area, a storage area of the common area is associated with one or a plurality of storage areas of the logical storage area of the second layer, and a storage area of the individual area is associated with one storage area of the logical storage area of the second layer,
the processor unit performs duplication determination on a plurality of data sets and associates a plurality of data sets determined as being duplicated with the common area to associate the storage area of the common area with a plurality of storage areas of the logical storage area of the second layer,
the processor unit performs a first deletion process of releasing the storage area of the individual area in a case where a request for deleting a data set associated with the storage area of the individual area is received,
the processor unit performs a second deletion process of releasing association between the storage area of the logical storage area of the first layer and the storage area of the logical storage area of the second layer for data in a case where a request for deleting the data associated with the storage area of the common area is received, and
the processor unit performs a common area releasing process of releasing a storage area that is the storage area of the common area and is not associated with the logical storage area of the second layer.

2. The computer system according to claim 1, wherein
deduplication information is included in which relational information between the storage area of the logical storage area of the first layer and the storage area of the logical storage area of the second layer for a data set stored with being associated with the common area is recorded,
the processor unit updates the deduplication information in a case where association with the storage area of the common area is performed and in a case where the second deletion process is performed, and
the processor unit performs the common area releasing process by referring to the deduplication information.

3. The computer system according to claim 1, wherein
a plurality of data sets that are targets for the duplication determination include at least two data sets among a data set for a write request, a data set associated with the individual area, and a data set associated with the common area.

4. The computer system according to claim 1, wherein
a data set for a write request, a data set associated with the individual area, and a data set associated with the common area correspond to the plurality of data sets that are targets for the duplication determination, and
in a case where it is determined that a plurality of data sets associated with the individual area are duplicated, the processor unit associates the logical storage area of the second layer for the plurality of data sets with the storage area of the common area and releases association with the storage area of the individual area for the plurality of data sets.

5. The computer system according to claim 1, wherein the storage area of the common area is associated with one or a plurality of storage areas of the logical storage area of the second layer, and
the associated storage area of the logical storage area of the second layer decreases in accordance with the second deletion process and is released in accordance with the common area releasing process.

6. The computer system according to claim 1, wherein a logical storage area of a third layer is included which is associated with storage areas of the logical storage area of the first layer and the logical storage area of the second layer, and
the logical storage area of the third layer is configured as an additional-writing space in which data is not rewritable and includes an additional-writing individual area and an additional-writing common area respectively associated with the individual area and the common area.

7. The computer system according to claim 1, wherein the processor unit performs a first deletion process of releasing the storage area associated with the individual area in a case where the processor unit receives a request for deleting the logical storage area of the second layer and there is the storage area, of the logical storage area of the second layer, which is associated with the individual area,
the processor unit performs a second deletion process of releasing association between the storage area associated with the common area and the logical storage area of the first layer in a case where the processor unit receives the request for deleting the logical storage area of the second layer and there is the storage area, of the logical storage area of the second layer, which is associated with the common area, and
the processor unit performs a common area releasing process of releasing a storage area that is the storage area of the common area and is not associated with the logical storage area of the second layer.

8. A storage control method of a computer system that is connected to a computer issuing a data input/output request and a storage device storing data, the storage control method comprising:
generating logical storage areas of a plurality of layers in which storage areas of mutual layers are associated with each other;
the logical storage areas of the plurality of layers including a logical storage area of a first layer of the storage device side and a logical storage area of a second layer of the computer side,
the logical storage area of the first layer including a common area and an individual area, a storage area of the common area being associated with one or a plurality of storage areas of the logical storage area of the second layer, and a storage area of the individual area being associated with one storage area of the logical storage area of the second layer,
performing duplication determination on a plurality of data sets;
associating a plurality of data sets determined as being duplicated with the common area to associate the storage area of the common area with a plurality of storage areas of the logical storage area of the second layer;
performing a first deletion process of releasing the storage area of the individual area in a case where a request for deleting a data set associated with the storage area of the individual area is received;
performing a second deletion process of releasing association between the storage area of the logical storage area of the first layer and the storage area of the logical storage area of the second layer for data in a case where a request for deleting the data associated with the storage area of the common area is received; and
performing a common area releasing process of releasing a storage area that is the storage area of the common area and is not associated with the logical storage area of the second layer.

9. A non-transitory computer readable medium storing a computer program for controlling a computer that issues a data input/output request and a storage device storing data, when executed by a processor, causes the processor to:
generate logical storage areas of a plurality of layers in which storage areas of mutual layers are associated with each other;
the logical storage areas of the plurality of layers including a logical storage area of a first layer of the storage device side and a logical storage area of a second layer of the computer side,
the logical storage area of the first layer including a common area and an individual area, a storage area of the common area being associated with one or a plurality of storage areas of the logical storage area of the second layer, and a storage area of the individual area being associated with one storage area of the logical storage area of the second layer,
perform duplication determination on a plurality of data sets;
associate a plurality of data sets determined as being duplicated with the common area to associate the storage area of the common area with a plurality of storage areas of the logical storage area of the second layer
perform a first deletion process of releasing the storage area of the individual area in a case where a request for deleting a data set associated with the storage area of the individual area is received;
perform a second deletion process of releasing association between the storage area of the logical storage area of the first layer and the storage area of the logical storage area of the second layer for data in a case where a request for deleting the data associated with the storage area of the common area is received; and
perform a common area releasing process of releasing a storage area that is the storage area of the common area and is not associated with the logical storage area of the second layer.

* * * * *